United States Patent
Sato et al.

(10) Patent No.: US 9,538,023 B2
(45) Date of Patent: Jan. 3, 2017

(54) INFORMATION PROCESSING APPARATUS CAPABLE OF COMMUNICATING WITH A TERMINAL APPARATUS, TERMINAL APPARATUS, AND CONTROL METHOD THEREOF

(71) Applicant: CANON KABUSHIKI KAISHA, Tokyo (JP)

(72) Inventors: Shigehiko Sato, Tachikawa (JP); Yasuhiro Yoshimura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/248,560

(22) Filed: Apr. 9, 2014

(65) Prior Publication Data
US 2014/0307282 A1  Oct. 16, 2014

(30) Foreign Application Priority Data

Apr. 11, 2013 (JP) .................................. 2013-083321

(51) Int. Cl.
*H04N 1/00*  (2006.01)
(52) U.S. Cl.
CPC ...... *H04N 1/00307* (2013.01); *H04N 1/00408* (2013.01); *H04N 1/00477* (2013.01); *H04N 2201/006* (2013.01); *H04N 2201/0036* (2013.01); *H04N 2201/0094* (2013.01); *H04N 2201/3219* (2013.01)
(58) Field of Classification Search
CPC ................................................ H04N 1/00307
USPC ............................................. 358/1.14, 1.15
See application file for complete search history.

(56) References Cited

U.S. PATENT DOCUMENTS

| | | | | |
|---|---|---|---|---|
| 2011/0069341 A1* | 3/2011 | Kim | ....................... | G06F 3/1204 358/1.15 |
| 2011/0292445 A1* | 12/2011 | Kato | ........................... | 358/1.15 |
| 2012/0019858 A1* | 1/2012 | Sato | ................... | H04N 1/00344 358/1.15 |
| 2013/0083358 A1* | 4/2013 | Suzuki | ........................ | 358/1.15 |
| 2013/0258381 A1* | 10/2013 | Sato | ..................... | G06F 3/1297 358/1.13 |
| 2013/0258382 A1* | 10/2013 | Sato | ............................. | 358/1.13 |
| 2013/0258390 A1* | 10/2013 | Suzuki et al. | ............... | 358/1.14 |
| 2013/0314302 A1* | 11/2013 | Jeung | .................... | G06F 3/1454 345/2.3 |

FOREIGN PATENT DOCUMENTS

| | | |
|---|---|---|
| JP | 2803236 B2 | 7/1998 |
| JP | 2005-341340 A | 12/2005 |
| JP | 2010-219879 A | 9/2010 |

\* cited by examiner

*Primary Examiner* — Jacky X Zheng
(74) *Attorney, Agent, or Firm* — Rossi, Kimms & McDowell LLP

(57) ABSTRACT

The communication unit of an information processing apparatus can perform a wireless communication with a terminal apparatus. A state identifier indicating the state of the information processing apparatus is obtained, and a device identifier for identifying the information processing apparatus and the state identifier are transmitted to the terminal apparatus through the communication unit. The terminal apparatus holds additional information corresponding to a state of an information processing apparatus which can be identified by the device identifier, and can display the additional information.

28 Claims, 23 Drawing Sheets

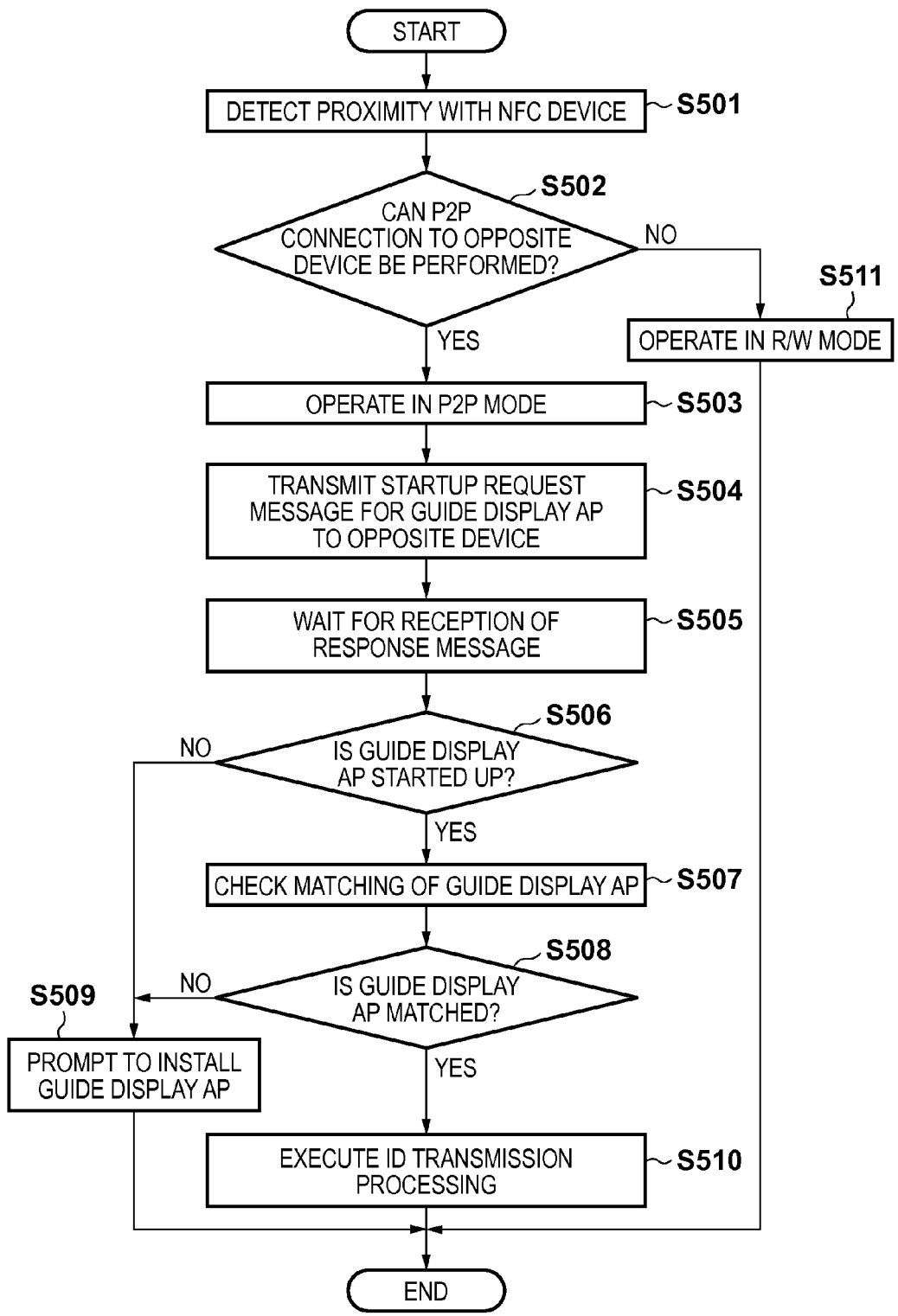

| SCREEN ID | SCREEN TYPE |
|---|---|
| 1 | COPY FUNCTION SCREEN |
| 2 | DENSITY SETTING SCREEN |
| 3 | PAPER SETTING SCREEN |
| 4 | DUPLEX PRINTING SETTING SCREEN |
| ⋮ | ⋮ |

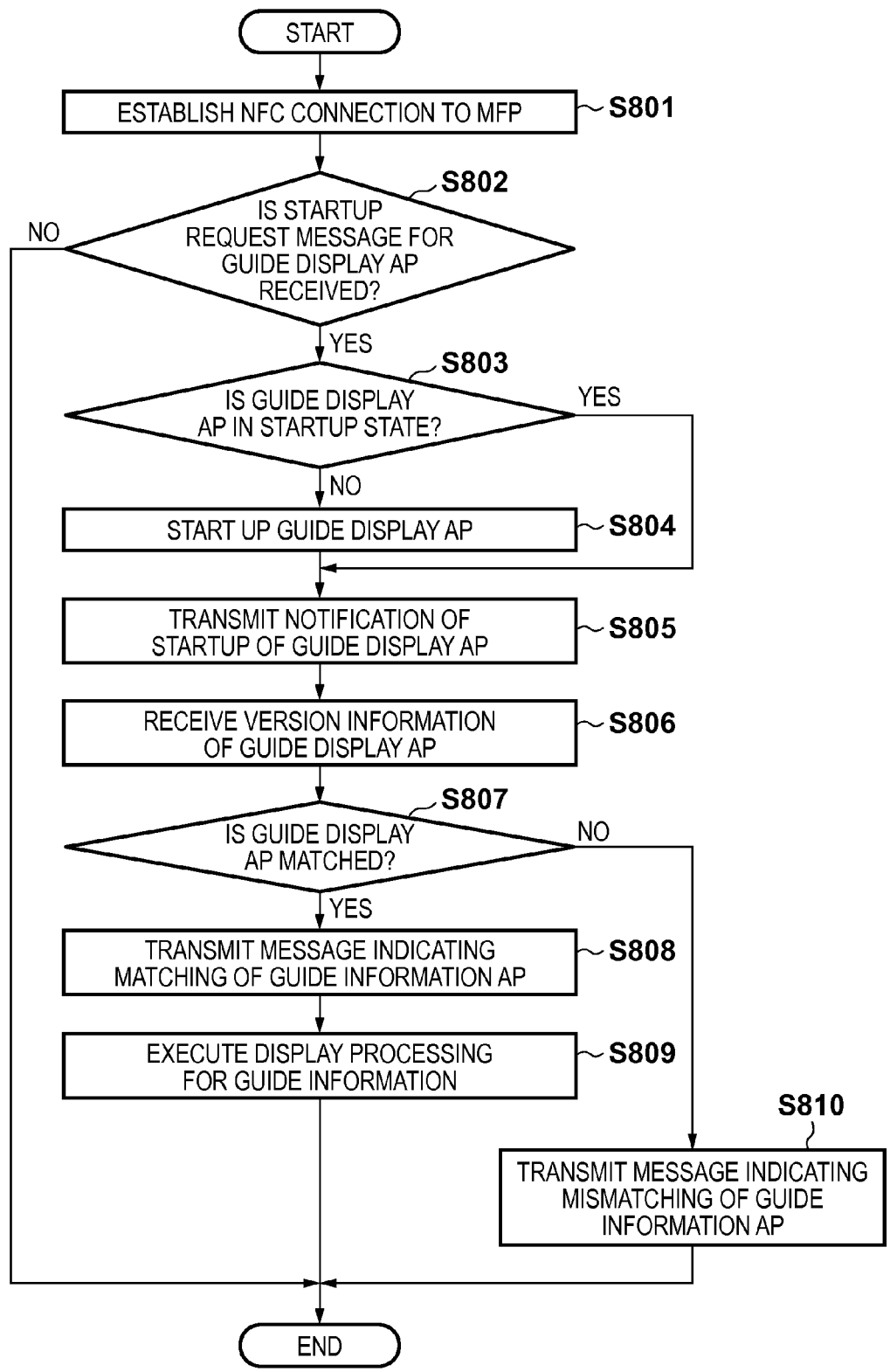

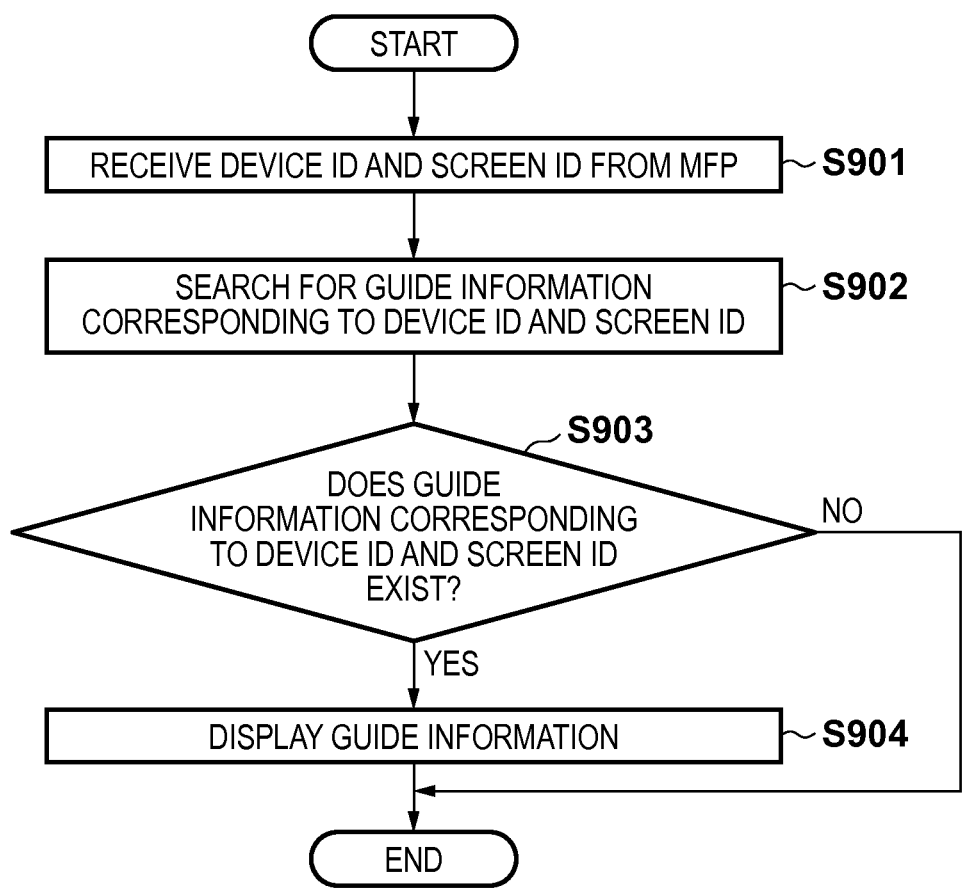
F I G. 6A

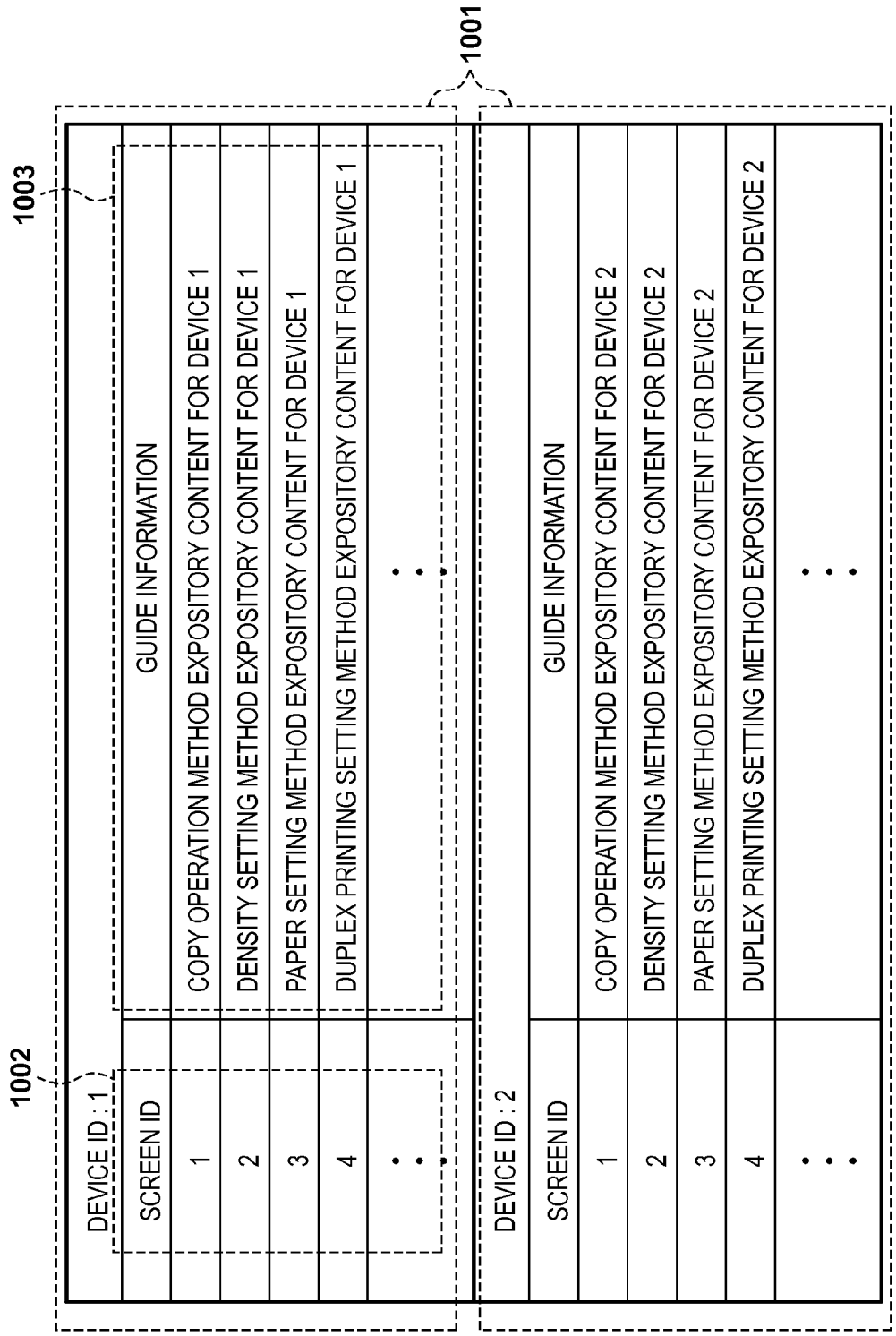

| STATE ID | STATE TYPE |
|---|---|
| 1 | DURING PRINTING |
| 2 | DURING SCAN |
| 3 | NO PAPER ERROR |
| 4 | PAPER JAM ERROR |
| ⋮ | ⋮ |

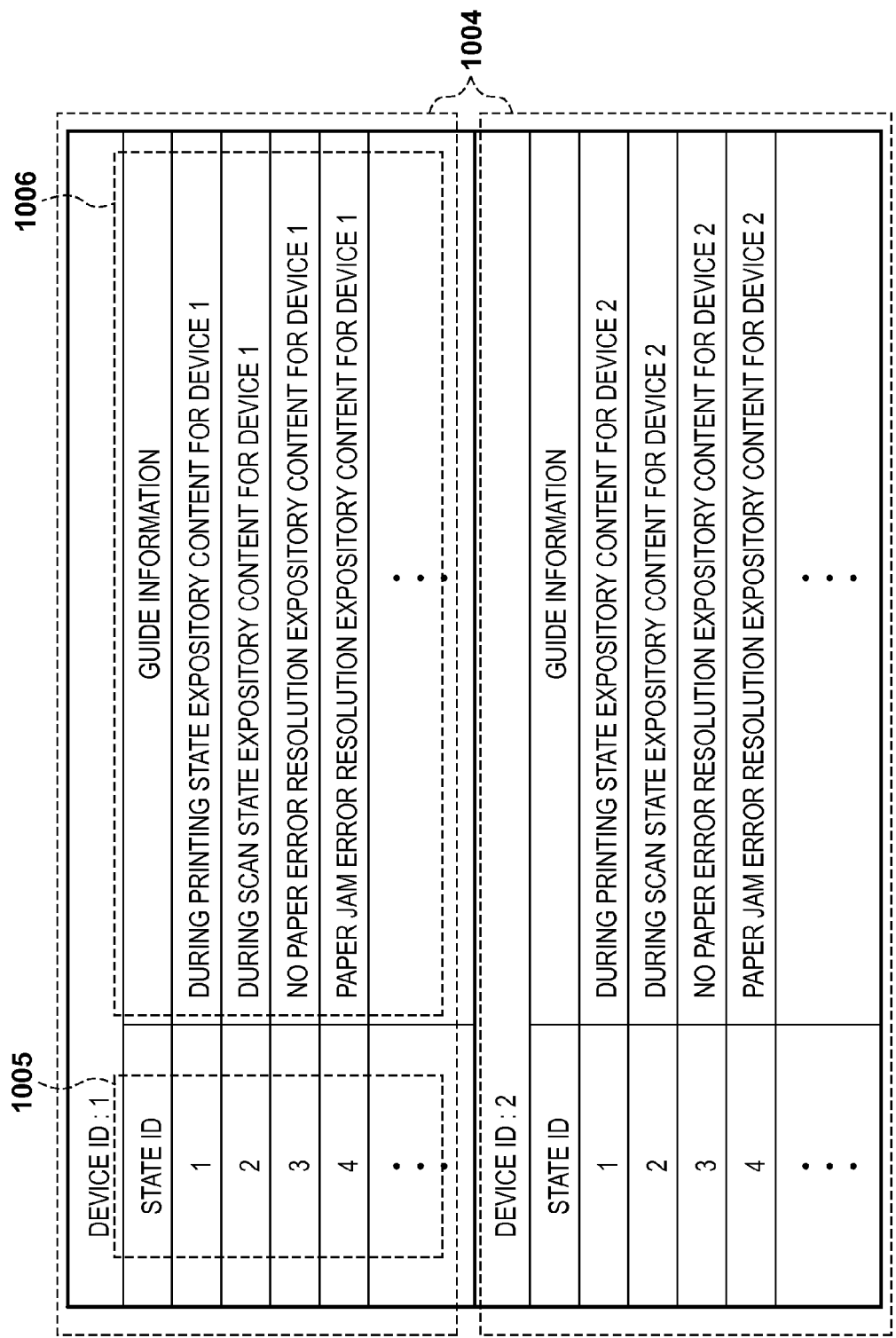

FIG. 14A

| ERROR ID | ERROR STATE |
|---|---|
| ERR001 | BUFFER ERROR |
| ERR002 | PDF MEMORY ERROR |
| ERR003 | PDF FONT ERROR |
| ERR004 | HARDWARE ERROR |
|  |  |

FIG. 14B

| OPERATION ID | OPERATION TYPE |
|---|---|
| OP001 | PRINT AFTER BUFFER SIZE ADJUSTMENT |
| OP002 | CANCEL PRINTING |
|  |  |

FIG. 14C

| DEVICE ID: 1 | |
|---|---|
| ERROR ID | OPERATION ID |
| ERR001 | OP001, OP002 |
| ERR002 | OP002 |
| ERR003 | OP002 |
| DEVICE ID: 2 | |
| ERROR ID | OPERATION ID |
| ERR001 | OP001, OP002 |
| ERR002 | OP002 |
| ERR003 | OP002 |

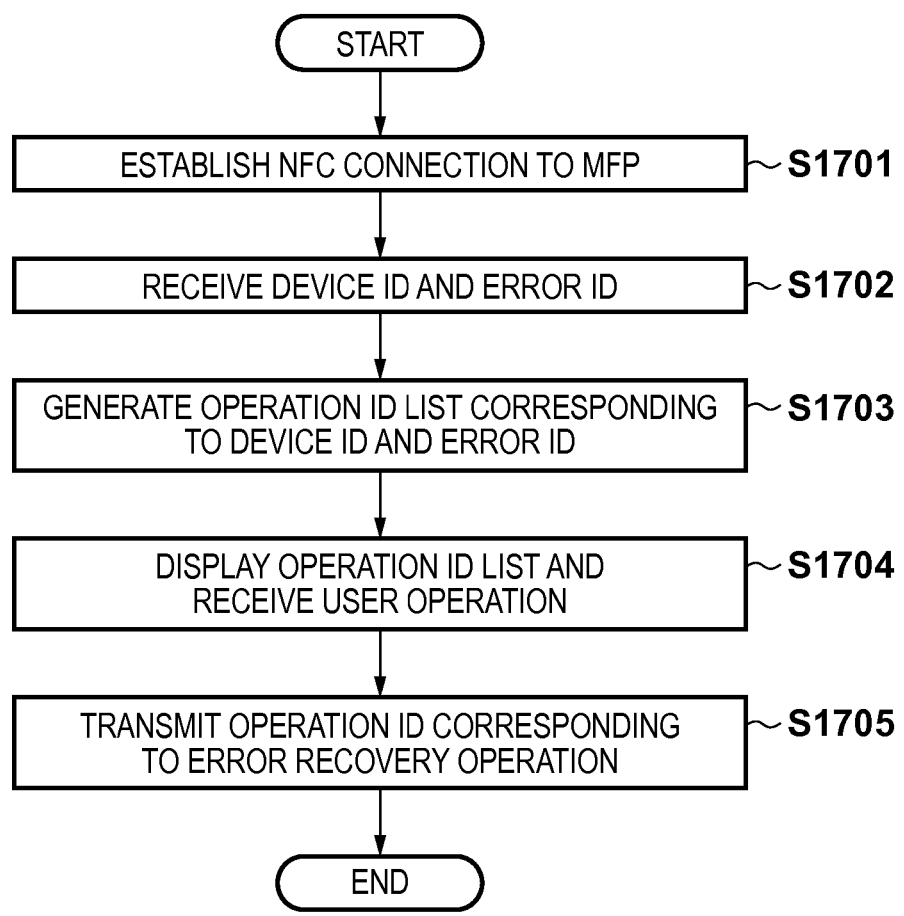

FIG. 18A

| ERROR ID | ERROR STATE |
|---|---|
| ERR001 | BUFFER ERROR |
| ERR002 | PDF MEMORY ERROR |
| ERR003 | PDF FONT ERROR |
| ERR004 | HARDWARE ERROR |
| | |

FIG. 18B

| CONVERSION ID | CONVERSION TYPE |
|---|---|
| CONV001 | PDF LIGHTENING |
| CONV002 | FONT EMBEDDING |
| | |

FIG. 18C

| DEVICE ID: 1 | |
|---|---|
| ERROR ID | CONVERSION ID |
| ERR001 | CONV001 |
| ERR002 | CONV001 |
| ERR003 | CONV001, CONV002 |
| DEVICE ID: 2 | |
| ERROR ID | CONVERSION ID |
| ERR001 | CONV001 |
| ERR002 | CONV001 |
| ERR003 | CONV001, CONV002 |

FIG. 20A

| ERROR ID | ERROR STATE |
|---|---|
| ERR001 | BUFFER ERROR |
| ERR002 | PDF MEMORY ERROR |
| ERR003 | PDF FONT ERROR |
| ERR004 | HARDWARE ERROR |
| | |

FIG. 20B

| PART ID | PART TYPE |
|---|---|
| PARTS001 | PAPER FEED CASSETTE |
| PARTS002 | MANUAL PAPER FEED TRAY |
| PARTS003 | PAPER FEED CASSETTE 2 |
| PARTS004 | PAPER FEED CASSETTE 3 |
| | |

FIG. 20C

| DEVICE ID: 1 | |
|---|---|
| ERROR ID | PART ID |
| ERR001 | PARTS003, PARTS004 |
| ERR002 | PARTS003, PARTS004 |
| ERR003 | PARTS001, PARTS002 |
| ERR004 | PARTS001, PARTS002 |
| DEVICE ID: 2 | |
| ERROR ID | PART ID |
| ERR001 | PARTS003, PARTS004 |
| ERR002 | PARTS003, PARTS004 |
| ERR003 | PARTS001, PARTS002 |
| ERR004 | PARTS001, PARTS002 |

INFORMATION PROCESSING APPARATUS CAPABLE OF COMMUNICATING WITH A TERMINAL APPARATUS, TERMINAL APPARATUS, AND CONTROL METHOD THEREOF

BACKGROUND OF THE INVENTION

Field of the Invention

The present invention relates to an information processing apparatus and a terminal apparatus, each of which has a wireless communication function.

Description of the Related Art

In recent years, there has been a proliferation of information devices having multiple functions such as an multifunctional peripheral (MFP). Information devices tend to be more multifunctional and have more complicated functions. When using such an information device, a user unfamiliar with operation, in particular, sometimes may have difficulty to perform a desired operation.

Instruction manuals describing operation methods for information devices have been increasingly digitized. In some cases, however, it is difficult to efficiently obtain information for improving user operability. There is available a technique of displaying guide information on the display of an information device having a display screen to efficiently provide the guide information. There is also available a technique of, when detecting an error state of an information device, registering the device ID of the device and an error code in a server and providing help information in accordance with the error state when the user refers to the server based on the two dimensional code of the information device read by a personal digital assistant.

According to the technique of displaying guide information on the display of the device, however, when displaying guide information on the operation screen of the MFP, it has problems such as the low degree of freedom of expression and cumbersome display operations. In addition, the technique of providing help information corresponding to an error state requires the processing of making a server manage states and device IDs obtained from information devices in association with each other in advance and providing help information based on the state of the information device corresponding to the device ID received from an information device.

SUMMARY OF THE INVENTION

In one aspect, an information processing apparatus comprising: a communication unit configured, to perform a wireless communication with a terminal apparatus; an obtaining unit configured to obtain a state identifier indicating a state of the information processing apparatus; and a transmission unit configured to transmit a device identifier for identifying the information processing apparatus and the state identifier to the terminal apparatus through the communication unit, wherein the terminal apparatus holds additional information corresponding to a state of an information processing apparatus which can be identified by the device identifier, and can display the additional information.

In another aspect, a terminal apparatus comprising: a control panel; a communication unit configured to perform a wireless communication with an information processing apparatus; a holding unit configured to hold additional information corresponding to a state of an information processing apparatus; a reception unit configured to receive a device identifier for identifying an information processing apparatus and a state identifier indicating a state of the information processing apparatus through the communication unit; and a control unit configured to select additional information corresponding to the device identifier and the state identifier from additional information held by the holding unit, and to display the selected additional information on a display screen of the control panel.

According to these aspects, the terminal apparatus can display guide information corresponding to the state of the information processing apparatus.

Further features of the present invention will become apparent from the following description of exemplary embodiment's with reference to the attached drawings.

BRIEF DESCRIPTION OF THE DRAWINGS

FIG. 3 is a flowchart for explaining processing by the CPU of an MFP.

FIG. 5 is a flowchart for explaining processing by the CPU of the smartphone.

FIGS. 6A and 6B are views for explaining display processing of guide information.

FIGS. 10A and 10B are views for explaining display processing of guide information in the second embodiment.

FIGS. 14A to 14C are views showing examples of the assignment of identifiers in the MFP.

FIG. 16 is a flowchart for explaining processing by the CPU of a smartphone.

FIGS. 18A to 18C are views showing examples of the assignment of identifiers in the MFP.

FIGS. 20A to 20C are views showing examples of the assignment of identifiers in the MFP.

DESCRIPTION OF THE EMBODIMENTS

An information processing system according to an embodiment of the present invention will be described in detail below with reference to the accompanying drawings.

First Embodiment

[Overview of System]

Figure 1:
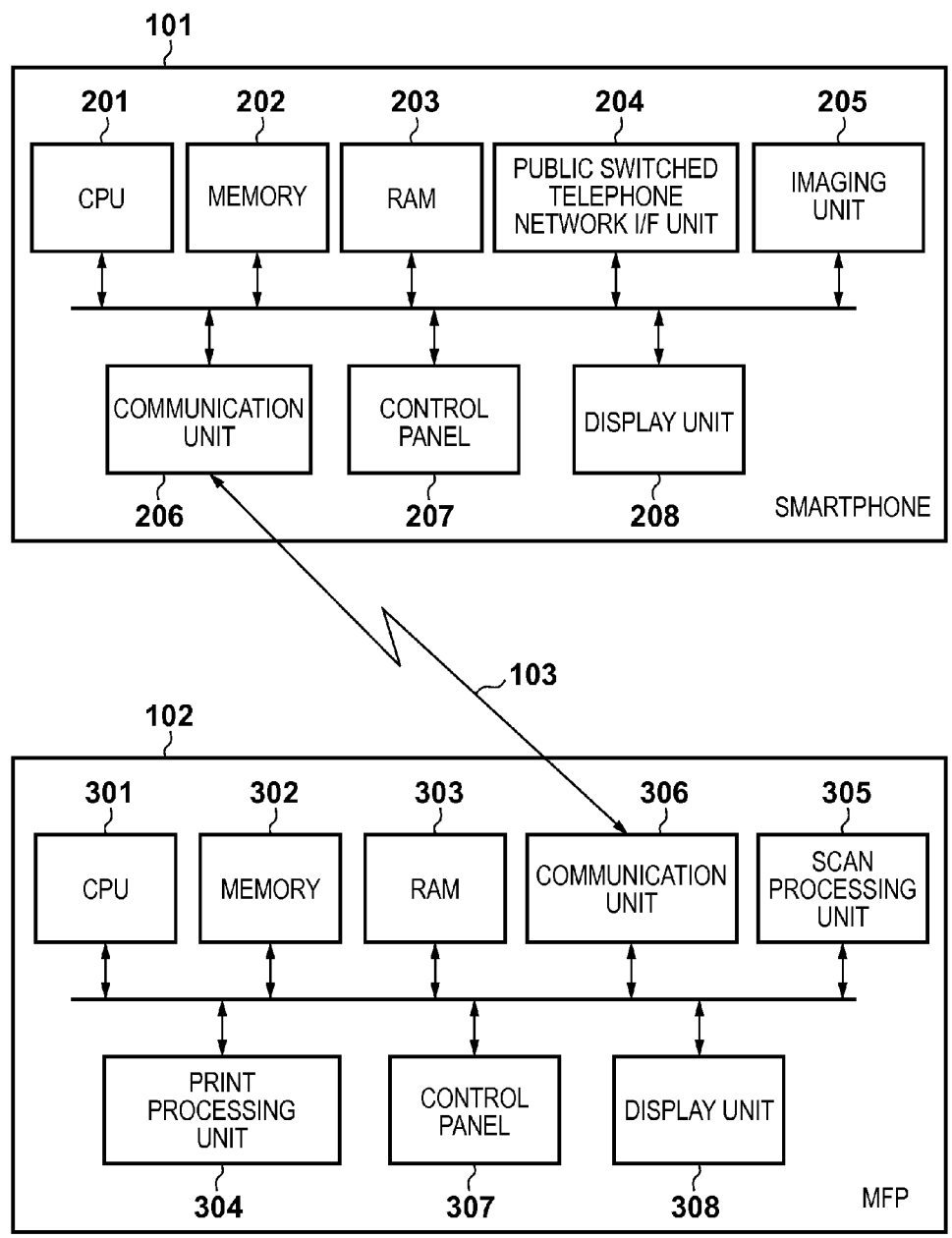
FIG. 1 is a block diagram for explaining the arrangements of a smartphone and MFP constituting an information processing system according to an embodiment.

The arrangements of a smartphone 101 and MFP 102 constituting an information processing system according to an embodiment will be described with reference to the block diagram of FIG. 1.

The information processing system includes the smartphone 101 as an information processing terminal apparatus and the MFP 102 as an information processing apparatus. It is possible to use, as an information processing terminal apparatus, a terminal apparatus such as a tablet computer other than a smartphone. In addition, an information processing apparatus is not limited to an MFP and may be an apparatus such as a projector or personal computer. The smartphone 101 and the MFP 102 can be communicatively connected to each other through near-field wireless communication 103.

This embodiment will exemplify a case of using NFC (Near Field Communication), which is a standard for short-range wireless communication, as a specific example of near-field wireless communication 103. Note, however, that it is possible to use, as a wireless communication means in place of NFC, Bluetooth®, Wi-Fi®, infrared communication, or the like for the near-field wireless communication 103.

Smartphone

A microprocessor (CPU) 201 controls the overall smartphone 101 to process the input information received by a control panel 207 and perform output processing for a display image on a display unit 208 by executing the OS (Operating System) and various types of programs stored in a nonvolatile memory 202 using a random access memory (RAM) 203 as a work memory. The nonvolatile memory 202 such as an EEPROM (Electrically Erasable Programmable Read-Only Memory) stores the above OS, various types of programs such as a guide display application (to be referred to as a "guide display AP" hereinafter) (to be described later), permanent data, and the like.

A public switched telephone network I/F (Interface) unit 204 enables the smartphone 101 and another communication apparatus to perform communication and calling between them via a telephone line. An imaging unit 205 includes an imaging lens and an imaging device, and generates image data by capturing an object image. A communication unit 206 includes an NFC chip (an IC chip complying with the NFC communication standard), and controls data transmission/reception by performing communication connection to a communication partner apparatus via the near-field wireless communication 103.

The control panel 207 includes operation buttons and a touch panel, and receives inputs to the smartphone 101 by button operation by the user and via the touch panel. The display unit 208 includes a display panel such as a liquid crystal panel, and displays a UI (User Interface) including images and texts corresponding to the processing contents of the smartphone 101.

A guide display AP is an application program including additional information associated with an operation guide for the MFP 102 and the like as contents (to be referred to as "guide information" hereinafter) such as texts, images, and moving images. Presenting guide information to the user can urge the user to understand a detailed operation method for the MFP 102. In addition, the data format of guide information is, for example, JPEG (Joint Photographic Experts Group), PNG (Portable Network Graphics), TIFF (Tagged Image File Format), or GIF (Graphics Interchange Format) for still images or MPEG-4 (Moving Picture Experts Group 4), SVG (Scalable Vector Graphics), or FLY (Flash Video) for moving images. In addition, as the data format of layout information, it is possible to use, for example, a general format such as HTML (Hyper Text Markup Language) or XML (Extensible Markup Language). Guide information is stored as part of the program data of the guide display AP in the memory 202 or the like, and is read out from the memory 202 by the CPU 201 in processing by the guide display AP.

If, for example, layout information in the HTML format and still image data in the JPEG format are stored in the memory 202 in advance, the CPU 201 interprets the HTML data and reads out the JPEG image data referred to by the layout information from the memory 202, and generates a bitmap image. The CPU 201 then displays the generated bitmap image on the display unit 208 to present it to the user. That is, the smartphone 101 is a terminal apparatus which includes a holding unit (memory 202) which holds additional information corresponding to the state of the MFP 102 and can display additional information.

Assume that, a guide display AP is installed in the memory 202 in advance at the shipment of the smartphone 101. Alternatively, the memory 202 stores a guide display AP when the user performs a downloading operation. Note that if a guide display AP is not installed at the shipment of the smartphone 101, a guide display AP may be downloaded and installed in the processing described later.

MFP

A CPU 301 comprehensively controls a processing sequence in the MFP 102 by executing the OS and various types of programs stored in a nonvolatile memory by using a RAM 303 as a work memory. A nonvolatile memory 302 such as a ROM stores the above OS, various types of programs such as a control program for a guide display AP, permanent data, and the like in advance. Note that a rewritable memory such as an EEPROM may be used in place of the ROM.

A print processing unit 304 includes, for example, a printer device of the ink-jet system or laser beam system, and performs control of the printer device and print processing for image data. A scan processing unit 305 includes a scanner device and performs control of the scanner device and read processing for a document image. The print processing unit 304 prints the image data read from the document or transmits the data to the communication partner apparatus via a communication unit 306.

The communication unit 306 includes an NFC chip, performs communication connection to the communication partner apparatus via the near-field wireless communication 103, and controls transmission/reception of data. A control panel 307 includes buttons and a touch panel, and receives inputs to the MFP 102 by button operation by the user and via the touch panel. A display unit 308 includes a display panel such as a liquid crystal panel, and displays a UI including images and texts corresponding to the processing contents of the MFP 102.

Assume that in the following description, the CPU 301 of the MFP 102 basically performs message transmission processing so as to make the communication unit 306 transmit the message generated by the CPU 301 to the communication unit 206 of the smartphone 101 via the near-field wireless communication 103. Likewise, to perform message reception processing by the CPU 301 is to make the CPU 301 process the message received by the communication unit 306.

Assume that the CPU 201 of the smartphone 101 basically performs message transmission processing so as to make the communication unit 206 transmit the message generated by the CPU 201 to the communication unit 306 of the MFP 102 via the near-field wireless communication 103. Likewise, to perform message reception processing by the CPU 201 is to make the CPU 201 process the message received by the communication unit 206.

[Activity Processing]

Activity processing by NFC used for connection between the MFP 102 and the smartphone 101 will be described with reference to the flowchart of FIG. 2.

In communication processing by NFC, an NFC device implements detection of a communication partner, communication establishment, and data transmission/reception by performing a series of processing called activities. The NFC device is a device including an IC chip complying with the NFC communication standard. In each activity, a plurality of NFC devices transmit and receive commands to and from each other to perform communication establishment, data exchange, and termination processing.

Activity transition will be described next. The NFC device detects, in a technology detection activity (S401), whether another NFC device (to be referred to as an "opposite device" hereinafter) exists in a communication range. If another NFC device exists, the NFC device determines an NFC type by command transmission/reception.

The NFC device then identifies NFC devices in a collision resolution activity (S402) if a plurality of NFC devices are detected. Subsequently, in an activation, activity (S403), the NFC device determines whether the opposite device corresponds to the P2P (peer to peer) mode, the CE (Card Emulator) mode, or the like, or discriminates a type to which an NFC tag corresponds.

The NFC tag is an IC tag which can be read by an NFC tag reader/writer. The P2P mode is a mode in which two NFC devices which perform communication can transmit and receive arbitrary data in two ways by operating in the P2P mode. The NFC device can transition to the CE mode which allows an access from the NFC tag reader/writer by behaving like an NFC tag and the R/W (Reader/Writer) mode in which the NFC device reads and writes the NFC tag, in addition to the P2P mode. In this embodiment, both the CPU 201 and the CPU 301 operate in the P2P mode to control communication between the communication unit 206 and the communication unit 306.

The NFC device then transmits and receives data to and from the opposite device in a data exchange activity (S404). In the data exchange activity, the NFC device can transmit and receive arbitrary data to and from the opposite device.

The NFC device then performs communication termination processing in a device inactivation activity (S405).

The series of processing from step S401 to step S405 has defined the communication mode of actively transmitting a command as the "Poll mode" according to the NFC standard. In contrast to this, the mode of the NFC device which receives a command from the NFC device in the Poll mode is defined as the "Listen mode". This embodiment will exemplify a case in which the MFP 102 in the Poll mode establishes communication connection to the smartphone 101 in the Listen mode. Note that the NFC device can generally switch between the Poll mode and the Listen mode, and hence an opposite case holds, that is, the smartphone 101 operates in the Poll mode while the MFP 102 operates in the Listen mode.

The above series of activity processing performs NFC connection establishment and data transmission/reception in accordance with the proximity between the NFC chip of the communication unit 306 of the MFP 102 and the NFC chip of the communication unit 206 of the smartphone 101.

[Processing by MFP]

Processing by the CPU 301 of the MFP 102 will be described with reference to the flowchart of FIG. 3.

Figure 2:
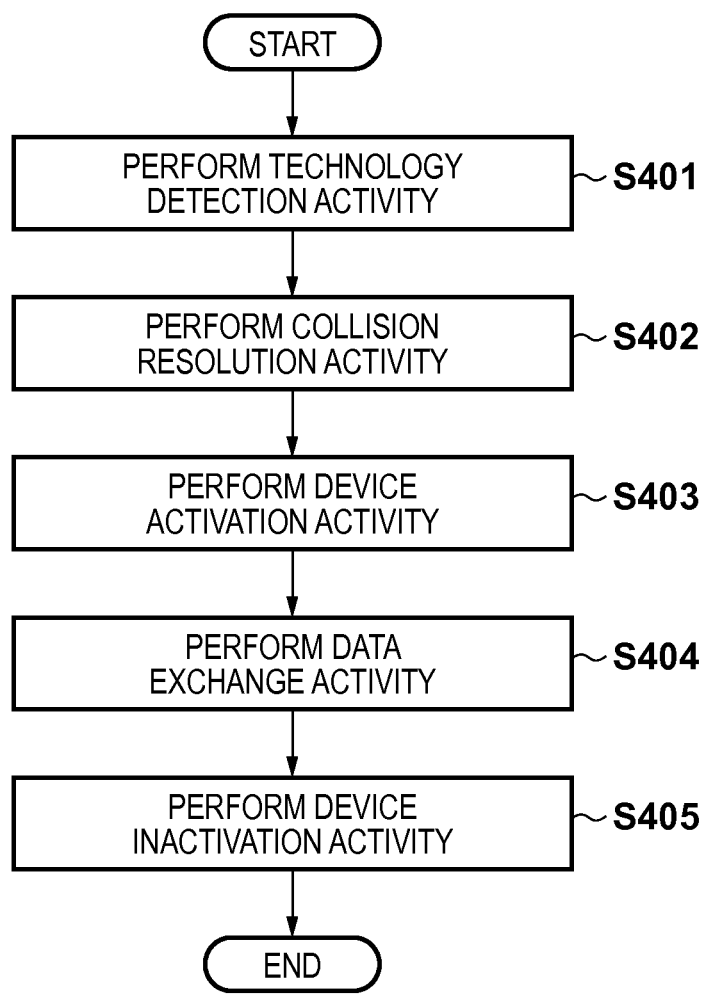
FIG. 2 is a flowchart for explaining activity processing by NFC used for the connection between the MFP and smartphone.

The CPU 301 starts NFC connection establishment processing (S501) upon detecting the proximity between the communication unit 306 and the communication unit 206 of the smartphone 101 by the activity processing (S401, S402, S403) shown in FIG. 2.

The CPU 301 then determines (S502) whether the opposite device operates in the P2P mode in the device activation activity (S403). If the opposite device is an NFC device which does not operate in the P2P mode, the CPU 301 does not perform the following processing. Note that if it is necessary to read and write an NFC tag for the implementation of another function of the MFP 102, the CPU 301 causes the MFP 102 to operate in the R/W mode (S511).

If the CPU 301 determines that the opposite device is an NFC device which operates in the P2P mode, the CPU 301 determines that it can perform connection in the P2P mode (to be referred to as "P2P connection" hereinafter), and causes the MFP 102 to operate in the P2P mode, thereby performing P2P connection to the opposite device (S503).

The subsequent transmission/reception processing from step S504 to step S508 corresponds to the data exchange activity (S404). That is, the CPU 301 transmits a startup request message for a guide display AP to the opposite device (S504), and waits for the reception of a response message from the opposite device (S505). Assume that a reception waiting time of 500 ms is provided. In this case, if the CPU 301 cannot receive any response message within, this time, the CPU 301 determines that a guide display AP has not started up (S506). If the CPU 301 has received a response message within the reception waiting time, the CPU 301 compares the ID value of the guide display AP with the value received in step S505 to determine whether the received value corresponds to the guide display AP (S506). Note that, the memory 302 or the like stores the ID value of the guide display AP in advance.

If the CPU 301 has not received any response message within the reception waiting time or the received value does not correspond to the guide display AP, the CPU 301 determines that the guide display AP has not started up, and does not perform the subsequent processing. Alternatively, the CPU 301 executes processing for prompting to install the guide display AP (S509), and terminates the processing. For example, the CPU 301 displays an installation procedure on the display unit 308, transmits the URI (Uniform Resource Identifier) of a Web site serving as a reference for installation to the opposite device, or transmits the program data of the guide display AP read out from the memory 302 or the like to the opposite device, and then terminates the processing.

Upon confirming the startup of the guide display AP, the CPU 301 checks the matching of the guide display AP (S507), That is, the CPU 301 reads out the version information of the guide display AP suitable for the display of the operation guide for the MFP 102 from the memory 302, and transmits the version information to the opposite device. The CPU 301 waits for the reception of a response message from the opposite device for a predetermined time. If the CPU 301 has not received any response message within the predetermined time or has received a response message indicating the mismatching of the version information (S508), the CPU 301 determines that the version of the guide display AP is mismatched.

Upon detecting the mismatching of the version, the CPU 301 executes processing for prompting to install a guide display AP of a suitable version (S509) and terminates the processing. For example, the display unit 308 displays an installation procedure or transmits the URI of a Web site serving as a reference for installation to the opposite device. In addition, the display unit 308 may display information indicating the failure in starting up the guide display AP or may display the URI of a download site of the guide display AP. Alternatively, the CPU 301 may transmit the program data of the guide display AP read out from the memory 302 or the like to the opposite device.

Note that even if the CPU 301 cannot detect the startup of the guide display AP in step S506, if the MFP 102 has another function operating in the P2P mode, the CPU 301 can transmit and receive a command to and from the opposite device, as needed.

Upon receiving a response message indicating the matching of version information in the guide display AP matching determination (S508), the CPU 301 determines that the guide display AP of the suitable version has started up, and executes ID transmission processing (S510) (to be described later). Note that in the first embodiment, the CPU 301 transmits a device ID and a screen ID in ID transmission processing (S510).

ID Transmission Processing

The ID transmission processing (S510) of transmitting a device ID and a screen ID will be described with reference to FIGS. 4A and 4B.

Figures 4A, 4B:
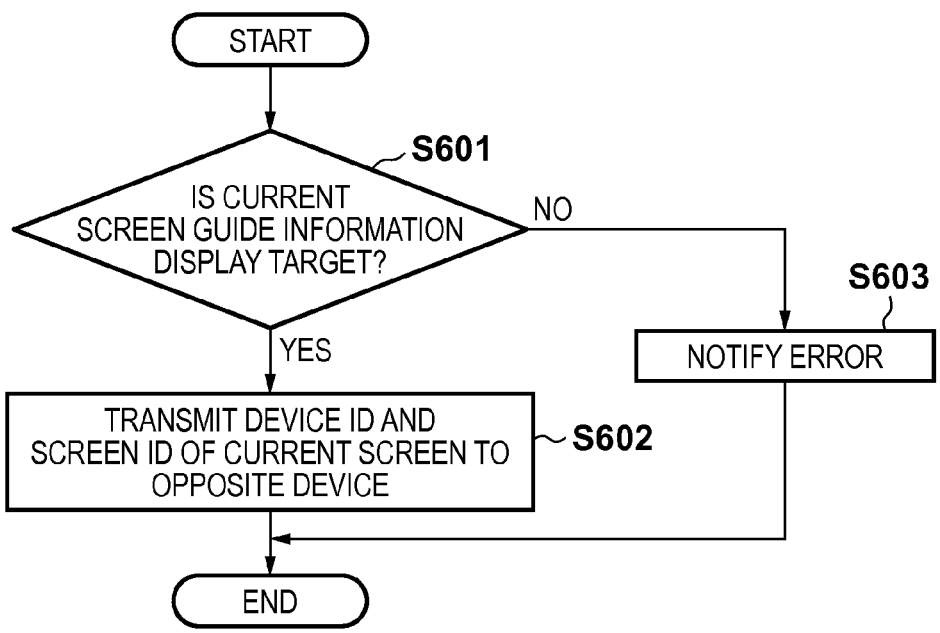
FIGS. 4A and 4B are views for explaining ID transmission processing.

As shown in FIG. 4A, the CPU 301 determines whether the screen (to be referred to as the "current screen" hereinafter) displayed on the display unit. 308 is a guide information display target (S601). That is, the CPU 301 determines whether the current screen is a guide information display target, by determining whether the discrimination table stored in the memory 302 includes a screen ID corresponding to the current screen which is held in the RAM 303. Note that the CPU 301 may skip the processing in step S601 to perform ID transmission on all screens without determining whether the current screen is a guide information display target.

If the current screen is a guide information display target, the CPU 301 transmits the screen ID of the current screen, together with the device ID stored in the memory 302, to the opposite device (S602).

A device ID is a device identifier indicating the model type of a product. As exemplarily shown in FIG. 4B, a screen ID is a screen identifier assigned to each operation screen displayed on the display unit 308. Operation screens include, for example, a "copy function screen" as a screen at the time of waiting for the execution of the copy function, a "density setting screen" for performing print density setting, a "recording paper setting screen" for performing recording paper setting, and a "duplex printing setting screen" for performing duplex printing setting. If, for example, the density setting screen is displayed on the display unit. 308, the CPU 301 transmits a screen ID=2 obtained from the table shown in FIG. 4B in step S602. Note that screen IDs may be values unique to the respective operation screens or the same values for several similar types of operation screens.

If the current screen is not a guide information display target, the CPU 301 notifies an error (S603). Screens which are not guide information display targets include, for example, a "during startup screen" indicating that startup processing is being performed and a "shutdown screen" indicating that shutdown processing is being performed. When notifying an error, the CPU 301 may display, for example, the message "there is no guide information" on the display unit 308 as a message notifying that there is no user guide information or may generate a beep sound. If there is no need to notify an error, the CPU 301 may skip error notification processing.

[Processing in Smartphone]

Processing by the CPU 201 of the smartphone 101 will be described with reference to the flowchart of FIG. 5.

The CPU 201 establishes NFC connection to the MFP 102 by causing the smartphone 101 to operate in the Listen mode and causing the communication unit. 206 to repeatedly receive a command transmitted by the MFP 102 and return a response in each activity shown in FIG. 2 (S801).

Upon waiting for the reception of a message from the MFP 102 and receiving a startup request message of the guide display AP (S802), the CPU 201 determines the startup state of the guide display AP (S803). If the guide display AP is in the startup state, the CPU 201 advances the process to step S805. If the guide display AP has not started up yet, the CPU 201 performs startup processing for the guide display AP (S804).

If the guide display AP is not installed in the memory 202, the CPU 201 may receive the URI of a download site for the guide display AP and display a message prompting the installation of the guide display AP on the display unit 208. Alternatively, the CPU 201 may receive the program data of the guide display AP and perform startup processing for the guide display AP upon installing the guide display AP in the memory 202.

Upon starting up the guide display AP, the CPU 201 transmits a startup notification as a message notifying the opposite device of the startup of the guide display AP to the MFP 102 (S805). At this time, the CPU 201 transmits an ID value indicating the guide display AP to the MFP 102. The CPU 301 of the MFP 102 can detect the startup of the guide display AP by referring to the received ID value.

The CPU 201 then checks the matching of the guide display AP. That is, the CPU 201 receives the version information of the guide display AP from the MFP 102 (S806), and compares the information with the version information of the guide display AP installed in the memory 202 (S807). If the two pieces of information match, the CPU 201 determines that the guide display AP is in the matched state, and transmits a message indicating the matching (S808). The CPU 201 then executes display processing for guide information (to be described later) based on the device ID and screen ID received from the MFP 102 (S809).

In addition, if the two pieces of version information do not match, the CPU 201 transmits a message indicating the mismatching (S810). If the CPU 201 detects the mismatching of the guide display AP, the communication unit 206 receives from the MFP 102 the information (the program data or the URI of a download site) for the installation of a guide display AP of a suitable version from the MFP 102.

Note that if the message received in step S802 is not a startup request for the guide display AP but is a processing request concerning another application, the smartphone 101 performs the processing concerning the application. At this time, a resident application (to be referred to as a "resident AP" hereinafter) which independently operates for allocation processing performs the processing of allocating the contents of the received message to an application (to be referred to as a "target AP" hereinafter) following the received message. That is, the resident AP analyses the received message and transfers the received message to the target AP. Note that the target AP is specified by using ID information specifying the target AP which is added to a transmission message by the CPU 301 of the MFP 102 to a transmission message.

Display Processing for Guide Information

Display processing (S809) for guide information will be described with reference to FIGS. 6A and 6B.

As shown in FIG. 6A, the CPU 201 receives a device ID and a screen ID from the MFP 102 (S901), and searches for guide information corresponding to the received device ID and screen ID by referring to a guide information correspondence table held in the memory 202 (S902). The CPU 201 then determines whether there is guide information corresponding to the received device ID and screen ID (S903). If there is guide information, the CPU 201 displays the guide information on the display unit 208 (S904).

In addition, if there is no guide information corresponding to the received device ID and screen ID, the CPU 201 does not display any guide information. Alternatively, the CPU 201 may display on the display unit 208 information indicating that the received device ID and screen ID do not correspond to any guide information. In addition, if, for example, the received device ID and screen ID indicate a screen that requires input of user information, such as the login screen, of the MFP 102, the CPU 201 may transmit the corresponding user information to the MFP 102.

FIG. 6B is a view showing an example of the guide information correspondence table. This table indicates guide information corresponding to a screen ID for each device ID. The CPU 201 selects a reference area 1001 corresponding to the received device ID. A device ID is assigned to each model type. A single guide display AP can display pieces of guide information for MFPs of different model types. The CPU 201 then extracts guide information from a guide information group 1003 by searching for a screen ID corresponding to the screen ID received from the selected reference area 1001.

The guide information "copy operation method expository content" is guide information expressing a copy function operation method, provided by the MFP 102 for the user, by using a content such as texts, illustrations, and moving images. Likewise, "density setting method expository content", "recording paper setting method expository content", and "duplex printing setting method expository content" are respective pieces of guide information including the contents of setting methods on the density setting screen, recording paper setting screen, and duplex printing setting screen described above.

If, for example, the received device ID is "1" and the received screen ID is "2", the CPU 201 selects density setting method expository content corresponding to device ID=1 as guide information from the correspondence table shown in FIG. 6B, and displays the content on the display unit 208.

[Display Screen and Guide Information]

Figure 7A:
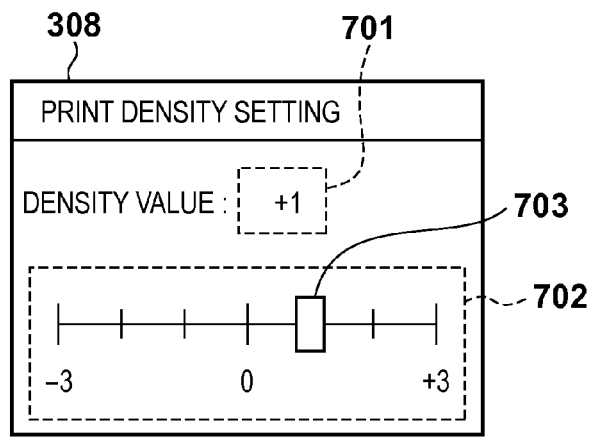
FIGS. 7A and 7B are views respectively showing display examples of a density setting screen and a density setting method expository content.
Figure 7B:
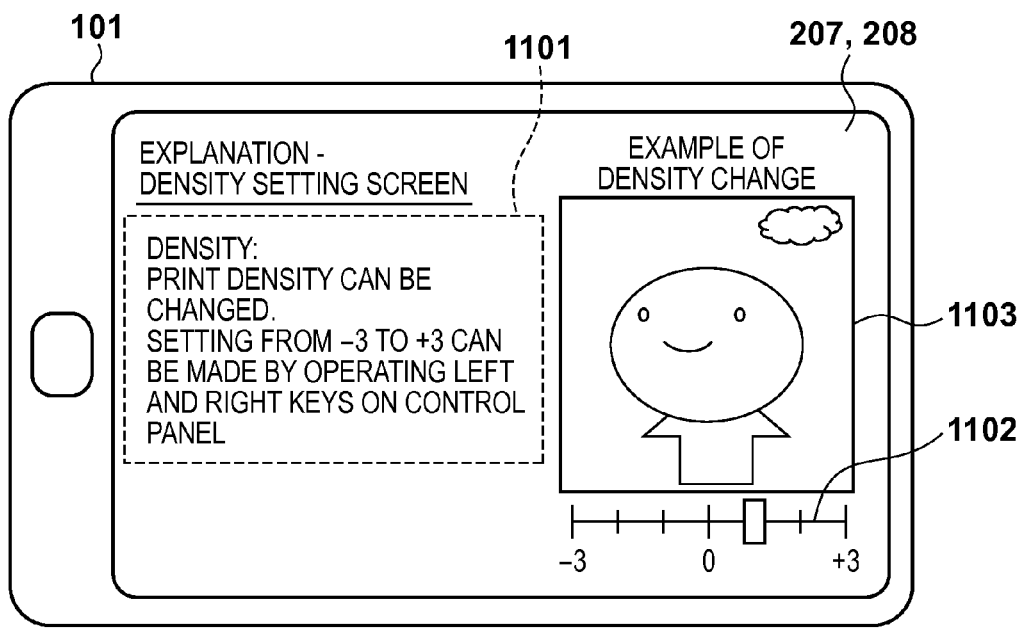

FIGS. 7A and 7B show display examples of the density setting screen and the density setting method expository content.

The density setting screen shown in FIG. 7A is a UI for setting a density value when the user prints using the MFP 102. FIG. 7A shows the display panel of the display unit 308. The current density value is displayed in a display portion 701 on the density setting screen. A sliding bar 702 indicates a scale for density value setting. A slider 703 indicates a set position on the scale. For example, the CPU 301 changes the display position of the slider 703 in accordance with a user operation with respect to a key on the control panel 307, and at the same time changes an indication of the display portion 701 to an indication of a density value synchronized with the slider position. This allows the user to set his/her desired density value.

An indication of the density setting method expository content shown in FIG. 7B is guide information presenting an explanation of the density setting screen to the user. FIG. 7B shows an outer appearance of the smartphone 101 having the touch panel including the control panel 207 and the display unit 208. The display unit 208 displays an expository writing 1101 on the density setting screen, a current set density 1102, and a change application example 1103 obtained when a density is changed.

The image displayed as the change application example 1103 is a sample image for helping the user to understand how a set density is reflected in an output image. A sample image to be displayed changes in accordance with a set density. This enables the user to grasp the correlation between set densities and output images.

In the state in which, for example, the MFP 102 is displaying the density setting screen shown in FIG. 7A, when the user brings the smartphone 101 proximate to a predetermined area of the MFP 102, the touch panel of the smartphone 101 displays guide information like that shown in FIG. 7B. The user can know an operation method for the density setting screen and how a change in density setting is reflected in an output image, by referring to this guide information.

[Communication Sequence]

Processing by the MFP 102 and the smartphone 101 and message exchange will be described with reference to the sequence chart, of FIG. 8. Note that each process has been described in detail above.

When the user brings the smartphone 101 proximate to the predetermined area of the MFP 102, the communication unit 206 and the communication unit 306 detect the proximity, and the CPU 201 and the CPU 301 perform NFC connection establishment processing (S1201). This corresponds to the processing from the technology detection activity (S401) to the device activation activity (S403) shown in FIG. 2. In this processing, the CPU 301 of the MFP 102 transmits a request message for communication connection establishment, and the CPU 201 of the smartphone 101 returns a response message with respect to the request message.

The processing from step S1202 to step S1206 corresponds to the data exchange activity (S404) shown in FIG. 2. The CPU 301 of the MFP 102 transmits a startup request message of the guide display AP (S1202). Upon receiving the startup request message, the CPU 201 of the smartphone 101 starts up the guide display AP as needed, and transmits a startup notification message notifying that the guide display AP has started up (S1203).

Upon receiving the startup notification message of the guide display AP, the CPU 301 of the MFP 102 transmits version information (S1204). The CPU 201 of the smartphone 101 collates the received version information with the version information of the installed guide display AP, and transmits a message including the collation result (S1205).

Upon confirming the matching of the guide display AP by using the received message including the collation result, the CPU 301 of the MFP 102 transmits a device ID and the screen ID of the current screen (S1206). The CPU 201 of the smartphone 101 displays the corresponding guide information on the display unit 208 based on the received device ID and screen ID (S1207).

Figure 8:
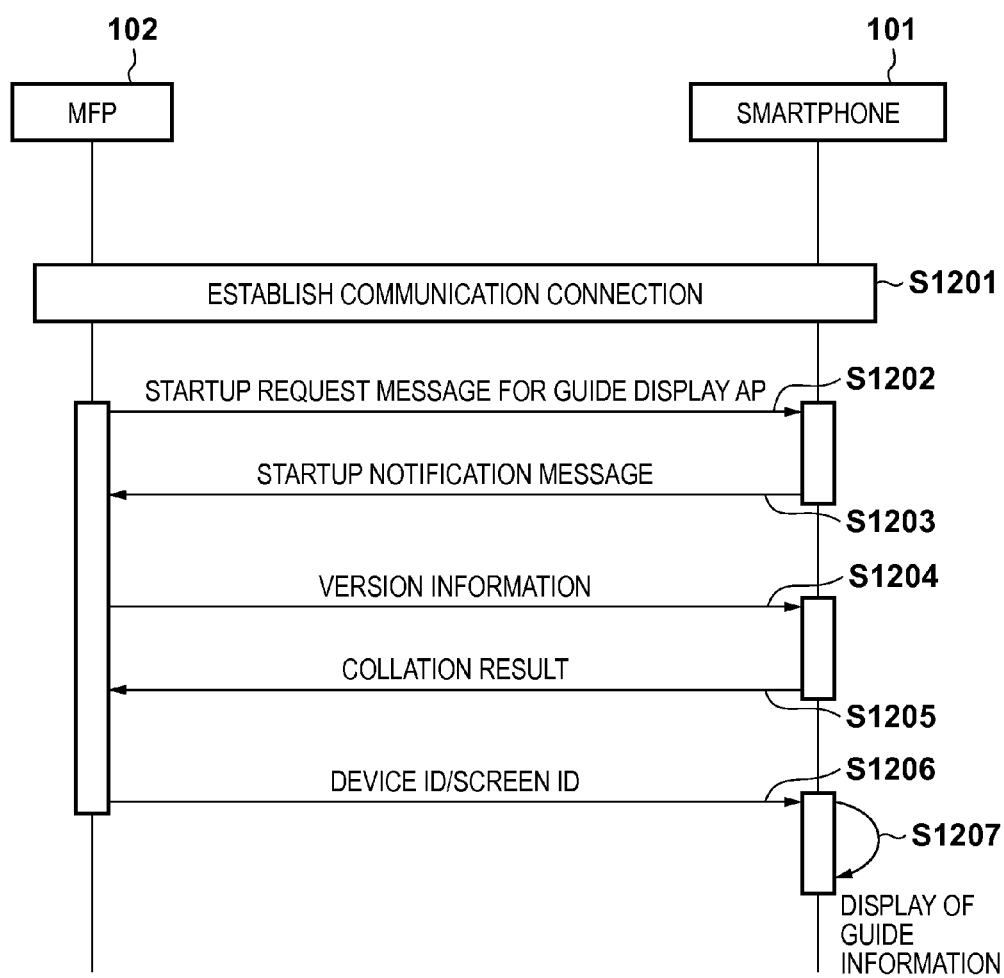
FIG. 8 is a sequence chart for explaining processing by the MFP and the smartphone and message exchange.

With the series of processing shown in FIG. 8, the information processing system of the embodiment displays on the display unit 208 of the smartphone 101 the "copy function expository content" as guide information with respect to "copy function screen" indication of the display unit 308 of the MFP 102. Likewise, the information processing system displays "density setting method expository content" as guide information with respect to "density setting screen" indication. In addition, the information processing system displays "recording paper setting expository content" and "duplex printing setting expository content" as guide information with respect to "recording paper setting screen" indication and "duplex printing setting screen" indication.

The CPU 201 of the smartphone 101 may receive an operation by the user after guide information display via the control panel 207 and a switch display content of the display unit 208 in accordance with the operation.

The above description has exemplified a case of uniquely deciding guide information in accordance with a combination of a device ID and a screen ID. However, this system may perform the following processing. In reception processing performed a plurality of times, upon consecutively receiving the same combination of a device ID and a screen ID in step S901 shown in FIG. 6A, the system may switch guide information to be displayed at the first and second reception timings and the subsequent timings. In addition, in reception processing performed a plurality of times, upon receiving screen IDs in a specific order, the system may display guide information corresponding to the order. In addition, the system may hold guide information correspondence tables and a content for the respective learning levels of the user and switch guide information to be displayed in accordance with the learning level. The user may set a learning level by operating the control panel 207 or the CPU 201 may determine a learning level from operation log information.

The information processing system according to the first embodiment can display additional information on the smartphone 101 in accordance with the screen display content of the MFP 102. Even if, therefore, the display unit 308 of the MFP 102 does not have a sufficient display area (the area of the display panel is small), the user can refer to a more detailed operation method of the MFP 102 by referring to the display on the smartphone 101. For example, in the above density value setting example, an external terminal (for example, a smartphone) displays a density value setting method and its effects to enable the user to operate the MFP 102 while referring to the setting method.

Second Embodiment

Information processing in the second embodiment of the present invention will be described below. Note that the same reference numerals as in the first embodiment denote the same components in the second embodiment, and a detailed description of them will be omitted.

The first embodiment has exemplified the case in which as the MFP 102 and the smartphone 101 come proximate to each other, the display unit 208 of the smartphone 101 displays guide information corresponding to the display screen of the display unit 308 of the MFP 102. The second embodiment will exemplify a case in which a display unit 208 of a smartphone 101 displays guide information corresponding to the operation state of an MFP 102 as the MFP 102 and the smartphone 101 come proximate to each other.

[Processing by MFP]

In the second embodiment, a CPU 301 of the MFP 102 executes processing similar that shown in FIG. 3. In ID transmission processing (S510), the first embodiment is configured to transmit a device ID and a screen ID, but the second embodiment is configured to transmit a device ID and a state ID. The ID transmission processing (S510) in the second embodiment will be described with reference to FIGS. 9A and 9B.

Figures 9A, 9B:
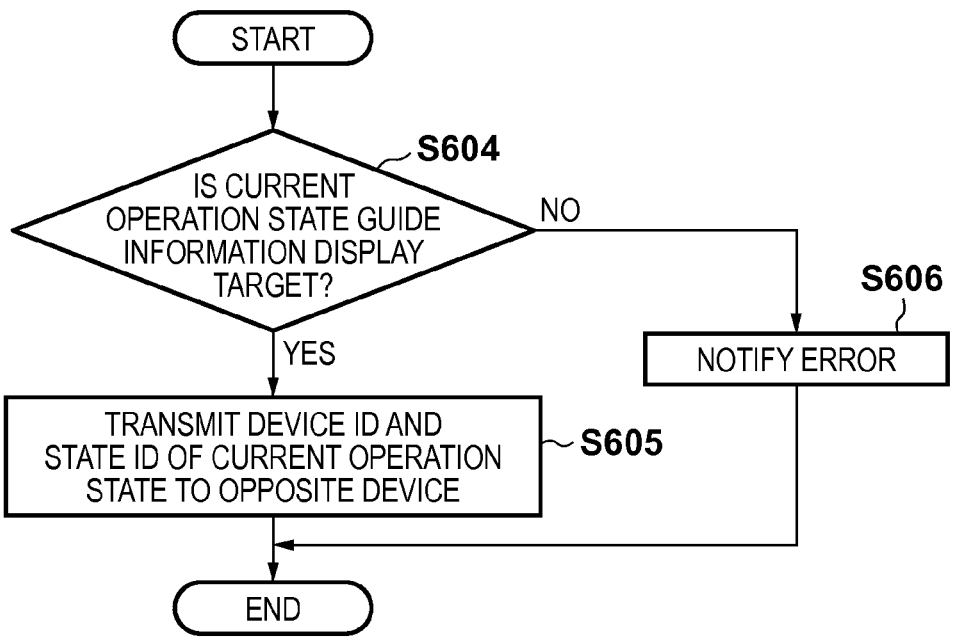
FIGS. 9A and 9B are views for explaining ID transmission processing in the second embodiment.

As shown in FIG. 9A, the CPU 301 determines whether the current operation state of the MFP 102 is a guide information display target (S604). That is, the CPU 301 determines whether the current operation state is a guide information display target, by determining whether the discrimination table stored in a memory 302 includes a state ID corresponding to the current operation state.

Upon determining that the current operation state is a guide information display target, the CPU 301 transmits the state ID indicating the current operation state, together with the device ID stored in the memory 302, to the opposite device (S605).

As exemplarily shown in FIG. 9B, a state ID is a state identifier assigned to each operation state of the MFP 102. Operation states include, for example, "during printing" indicating a state in which a print output is being processed, "during scan" indicating a state in which a document is being read, "no recording paper error" indicating a state in which no recording paper for printing is set in the device, and "paper jam error" indicating a state in which a paper jam has occurred at the time of the conveyance of recording paper. If, for example, an operation state corresponds to a paper jam error, the CPU 301 transmits state ID=4 obtained from the table shown in FIG. 9B in step S605.

If the current operation state is not a guide information display target, the CPU 301 notifies an error (S606). For example, when notifying an error, the CPU 301 may display the message "there is no guide information" on a display unit 308 as a message notifying that there is no user guide information ox-generate a beep sound. If this processing is unnecessary, the CPU 301 may skip error notification itself.

[Processing by Smartphone]

In the second embodiment, the CPU 201 of the smartphone 101 executes processing similar to that shown in FIG. 5. However, the second embodiment differs from the first embodiment in guide information display processing (S809). Guide information, display processing (S809) in the second embodiment, will be described with reference to FIGS. 10A and 10B.

Figure 10A:
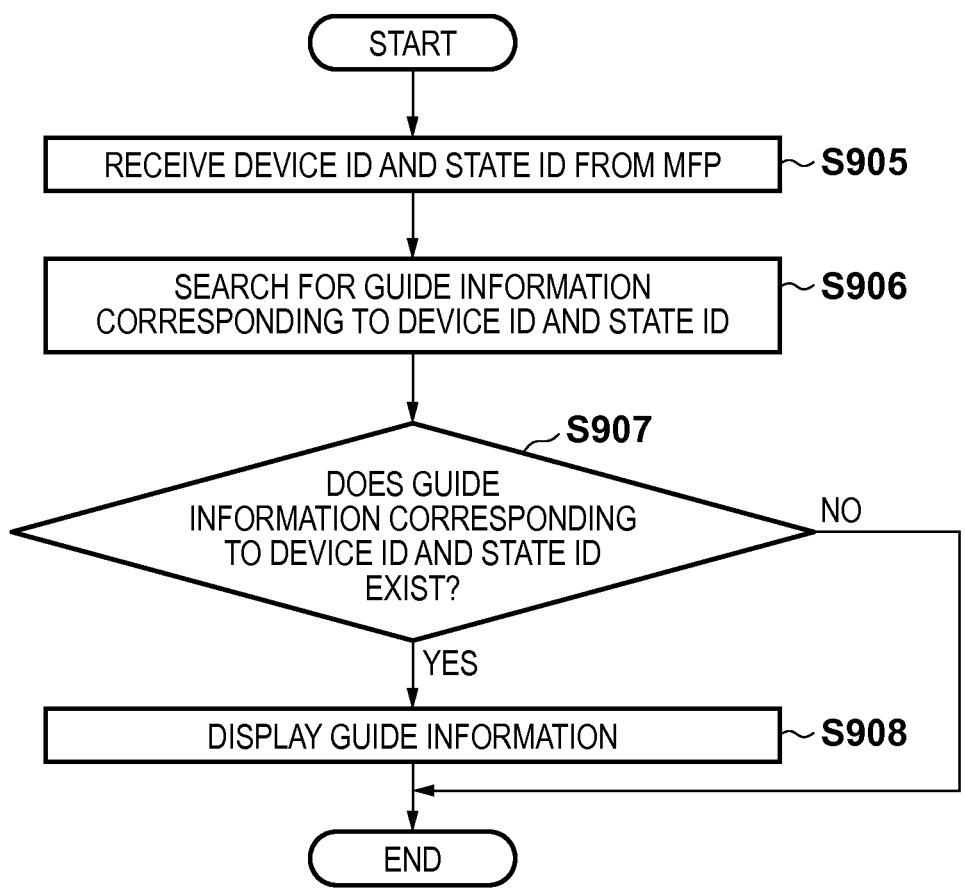

As shown in FIG. 10A, a CPU 201 receives a device ID and a state ID from the MFP 102 (S905), and searches for guide information corresponding to the received device ID and state ID by referring to the guide information correspondence table held in a memory 202 (S906). The CPU 201 then determines whether there is any guide information corresponding to the received device ID and state ID (S907). If there is guide information, the CPU 201 displays it on the display unit 208 (S908).

If there is no guide information corresponding to the received device ID and state ID, the CPU 201 displays no guide information. Alternatively, the CPU 201 may display, on the display unit 208, information indicating that the received device ID and state ID correspond to no guide information.

FIG. 10B is a view showing an example of guide information correspondence table. This table indicates guide information corresponding to a state ID for each device ID. The CPU 201 selects a reference area 1004 corresponding to the received device ID. A device ID is assigned to each model type. A single guide display AP can display pieces of guide information for MFPs of different model types. The CPU 201 then extracts guide information from a guide information group 1006 by searching for a state ID corresponding to the screen ID received from the selected reference area 1004.

The guide information "during printing state expository content." is guide information explaining information concerning print processing (for example, the remaining amount of ink or toner and estimated processing time) displayed on the display unit. 308 of the MFP 102 during printing. Likewise, the guide information "during scan state expository content" is guide information explaining information concerning scan processing (for example, a set content, and a scan procedure). In addition, the guide information "no paper error resolution expository content" and the guide information "paper jam error resolution expository content" are respectively pieces of guide information expressing resolution procedures for the above no recording paper error and the above paper jam error by using texts, illustrations, moving images, and the like.

If, for example, the received device ID is "1" and the received state ID is "4", the CPU 201 selects a paper jam error resolution, expository content for device ID=1 from the correspondence table shown in FIG. 10B as guide information and displays it on the display unit 208.

[Display Screen and Guide Information]

Figure 11A:
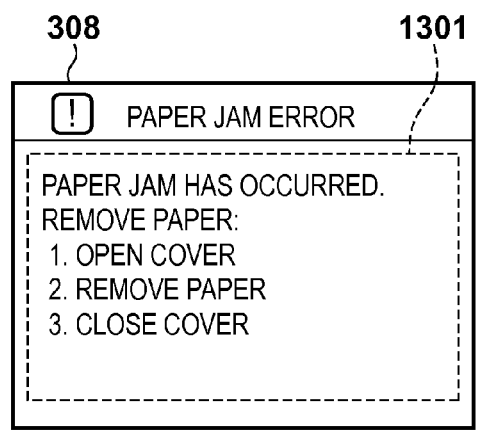
FIGS. 11A and 11B are views showing display examples at the time of a paper jam error.
Figure 11B:
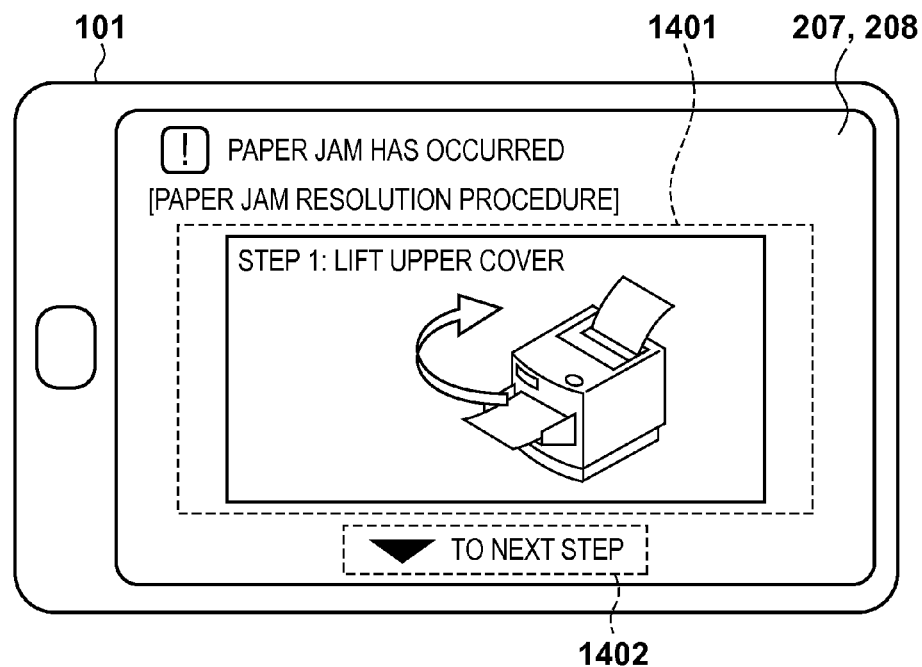

The display examples at the time of a paper jam error will be described with reference to FIGS. 11A and 11B. FIG. 11A shows a display example on the display unit 308 of the MFP 102. FIG. 11B shows a display example on the display unit 208 of the smartphone 101.

A paper jam is a trouble that occurs in a convey mechanism in a device due to a jam of recording paper during conveyance. When resolving a paper jam error, it is necessary to remove jammed recording paper by opening the device cover according to a predetermined procedure. As shown in FIG. 11A, the display unit 308 displays a paper jam error resolution procedure 1301 including the first step "open cover", the second step "remove paper", and the third step "close cover".

The paper jam error resolution expository content shown in FIG. 11B is guide information which presents the user with the details of a paper jam error resolution procedure. FIG. 11B shows an outer appearance of the smartphone 101 having a touch panel including a control panel 207 and the display unit 208. The display unit. 208 displays an image 1401 for explaining a paper jam error resolution procedure.

The image 1401 is an image including a text showing a procedure to be executed by the user, together with a photo or illustration showing the MFP 102. Note that the image 1401 may be either a still image or a moving image. It is also possible to simultaneously explain an operation procedure by speech using the speech output device (speaker or the like) of the smartphone 101. In addition, the CPU 201 displays a button 1402 which receives an instruction to advance to the next step. Upon detecting a touch operation on the button 1402, the CPU 201 displays the next step on the display unit 208.

[Communication Sequence]

Processing by the MFP 102 and the smartphone 101 and message exchange will be described with reference to the sequence chart of FIG. 12. Note that each process has been described in detail above.

When the user brings the smartphone 101 proximate to a predetermined area of the MFP 102, a communication unit 206 and a communication unit 306 detect the proximity, and the CPU 201 and the CPU 301 perform NFC connection establishment processing (S1208). This corresponds to the processing from the technology detection activity (S401) to the device activation activity (S403) shown in FIG. 2. In this processing, the CPU 301 of the MFP 102 transmits a request message for communication connection establishment, and the CPU 201 of the smartphone 101 returns a response message with respect to the request message.

The processing from step S1209 to step S1213 corresponds to the data exchange activity (S404) shown in FIG. 2. The CPU 301 of the MFP 102 transmits a startup request message of the guide display AP (S1209). Upon receiving the startup request message, the CPU 201 of the smartphone 101 starts up the guide display AP as needed, and transmits a startup notification message notifying that the guide display AP has started up (S1210).

Upon receiving the startup notification message of the guide display AP, the CPU 301 of the MFP 102 transmits version information (S1211). The CPU 201 of the smartphone 101 collates the received version information with the version information of the installed guide display AP, and transmits a message including the collation result (S1212).

Upon confirming the matching of the guide display AP by using the received message including the collation result, the CPU 301 of the MFP 102 transmits a device ID and a state ID corresponding to the current operation state (S1213). The CPU 201 of the smartphone 101 displays the corresponding guide information on the display unit 208 based on the received device ID and state ID (S1214).

Figure 12:
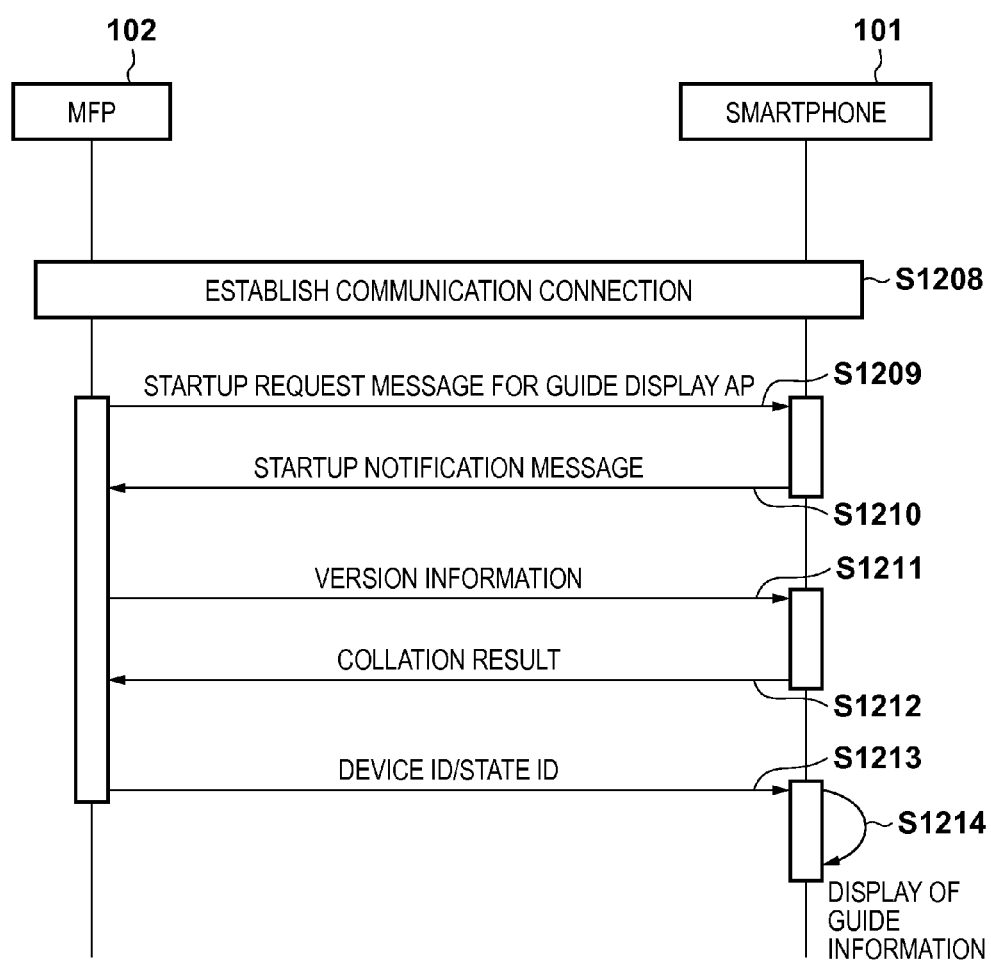
FIG. 12 is a sequence chart for explaining processing by the MFP and the smartphone and message exchange.

With the series of processing shown in FIG. 12, the information processing system of the second embodiment displays the "during printing state expository content" as guide information on the display unit 208 of the smartphone 101 with respect to the state "during printing" of the MFP 102. Likewise, the information processing system displays "during scan state expository content" as guide information with respect to the state "during scan". In addition, the information processing system displays "no paper error resolution expository content" and "paper jam error resolution expository content" as guide information with respect to the state "no recording paper error" and the state "paper jam error".

The information processing system according to the second embodiment can display information corresponding to the operation state of the MFP 102 on the smartphone 101. This allows the user to grasp the details of the MFP 102 in more detail. For example, when a paper jam error has occurred, an external terminal (for example, the smartphone 101) displays a resolution procedure for the error. For example, even if it is difficult for the user to refer to the display unit 308 of the MFP 102, he/she can perform a paper jam resolution operation, by referring to the resolution procedure displayed on the external terminal.

Modification of Embodiments

In the first and second embodiments, when a guide display AP is an application dedicated to a specific model, the smartphone 101 need not hold a guide information correspondence table for each device ID, and the MFP 102 need not transmit any device ID.

In the first and second embodiments, guide information may be displayed in accordance with the state of a component of the MFP 102. For example, the smartphone switches guide information to be displayed depending on whether the document table cover of the scanner device of the scan processing unit 305 of the MFP 102 is open. If, for example, the document table cover is open, the smartphone displays precautions about the flat scanner, for example, the direction and placement of a document placed on the document table (for example, a corner of the document table against which the upper left corner of a document is to abut). In addition, if the document table cover is closed, the smartphone displays precautions about the ADF (Auto Document Feeder), for example, placing a document with its surface to be read facing up.

The first and second embodiments may be configured to display guide information corresponding to a user setting. For example, the smartphone displays guide information, indicating a specific tray in which, recording paper should be set, depending on whether the user selects to feed paper front a recording paper feed tray or manual paper feed tray when selecting a paper feed tray.

The first and second embodiments are configured to display guide information upon switching from the original screen displayed on an external terminal. If, however, the external terminal functions as a remote UI for an information processing apparatus, guide information may be superimposed and displayed on the remote UI. The remote UI is a UI which includes minimum necessary buttons for operating the information processing apparatus and a screen and enables to remotely control the information processing apparatus from the external terminal. The external terminal has an application for implementing a remote UI for operating the information processing apparatus, transmits and receives commands to and from the information processing apparatus by wireless communication, and reflects a user operation on the external apparatus in the information processing apparatus. Superimposing and displaying guide information on the remote UI can more directly help the user concerning buttons to be operated by the user and information on the screen to which the user should pay his/her attention. For example, it is possible to highlight a button to be operated next, annotate a button, and highlight information indicating an inconvenience in a displayed parameter or setting (for example, information indicating that staple setting is made in spite of the fact that there is no finisher).

Figure 13A:
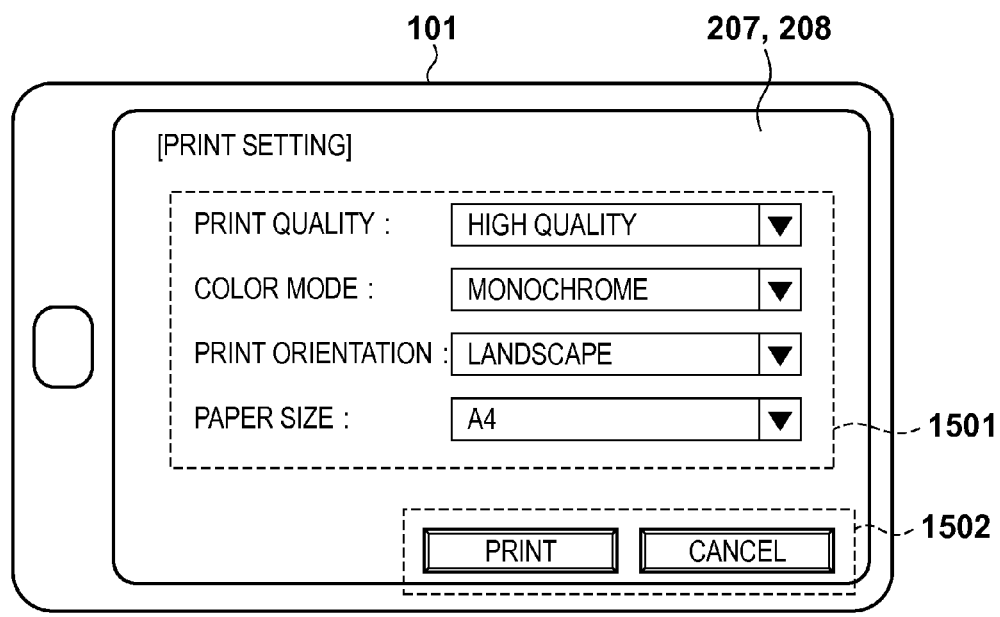
FIGS. 13A and 13B are views showing display examples in a case in which the smartphone operates as a remote control UI of the MFP.
Figure 13B:
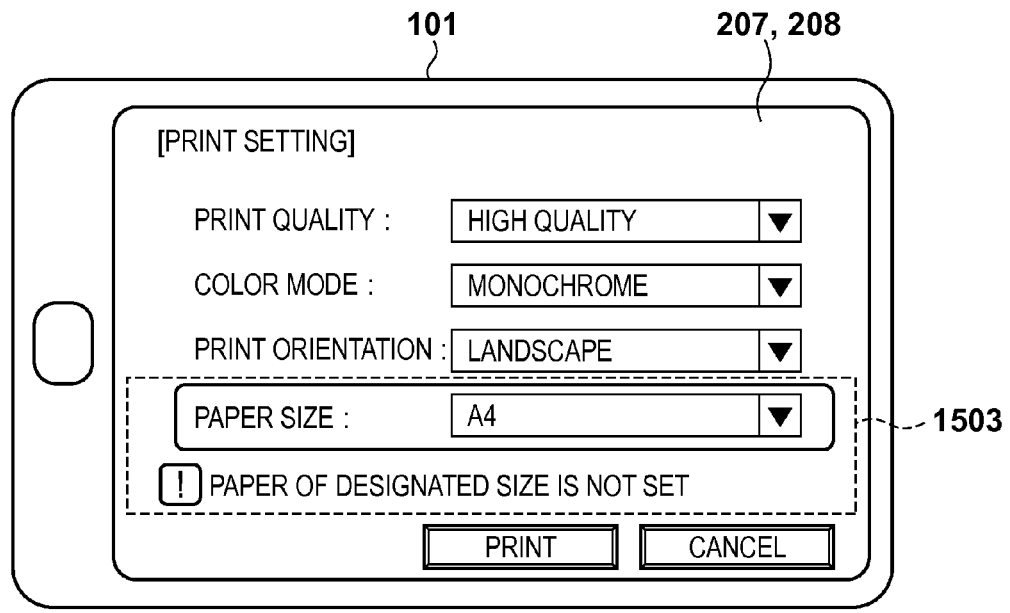

FIGS. 13A and 13B each show a display example in a case in which the smartphone 101 operates as a remote UI for the MFP 102.

Referring to FIG. 13A, the smartphone 101 receives a touch operation by the user. The smartphone receives various types of print settings based on touch operations on a print setting area 1501 and receives a print execution/non-execution (cancel) operation based on a touch operation on an execution selection area 1502.

When making print setting, the user can set a print quality, a color mode, a print orientation, a paper size, and the like. In the case shown in FIG. 13A, the print quality is set to "high quality", the color mode is set to "monochrome", the print orientation is set to "landscape", and the paper size is set to "A4 size". In this state, when the user brings the smartphone 101 proximate to a predetermined area of the MFP 102, guide information 1503 is superimposed/displayed on the remote UI screen by the processing described in the first and second embodiments, as shown in FIG. 13B.

FIG. 13B shows a display example of guide information in a case in which recording paper of the recording paper size designated by the user with the remote UI is not set in the paper feed tray of the MFP 102. The smartphone displays a frame marker around a recording paper size setting area, and a warning message such as "paper of designated size is not set" on the lower side of the setting area. The user sets recording paper of a necessary size (A4 in this case) in the MFP 102 upon referring to the guide information 1503 or changes the recording paper size setting by operating the recording paper size setting area upon checking the recording paper size set in the MFP 102.

As described above, even a user unfamiliar with the operation of the MFP 102 is expected to easily understand the operation method of the MFP 102 by referring to the guide information displayed on the smartphone 101. If the display area of the display unit 308 of the MFP 102 is too small to display the operation method, in particular, using the above information processing system enables the user to operate the MFP 102 while referring to the guide information of the operation method.

In addition, even if the memory 302 or RAM 303 of the MFP 102 does not have a storage capacity enough to store and process guide information, using the above information processing system can present the guide information to the user. Furthermore, the smartphone 101 manages the association between the device identifier, state identifiers, and additional information of the MFP 102 and performs direct communication with the device. This makes it possible to more easily present the user with desired guide information without via a server.

Third Embodiment

Information processing according to the third embodiment of the present invention will be described below. Note that the same reference numerals as in the first and second embodiments denote the same components in the third embodiment, and a detailed description of them will be omitted.

The second embodiment has exemplified the case in which as the MFP 102 and the smartphone 101 come proximate to each other, the display unit 208 of the smartphone 101 displays guide information corresponding to the operation state of the MFP 102. The third embodiment will exemplify a case in which as an MFP 102 and a smartphone 101 come proximate to each other, a display unit 208 of the smartphone 101 displays a list of error resolution methods corresponding to the operation state of the MFP 102, the user selects a resolution method, and the MFP 102 executes resolution processing as the MFP and the smartphone come proximate to each other, The MFP 102 can undergo, for example, the following error states: a "buffer error" which, occurs when the buffer becomes insufficient during printing, a "PDF memory error" which occurs when the memory used to process a document in a portable document format (to be referred to as a "PDF document" hereinafter) becomes insufficient, a "PDF font error" which occurs when the MFP 102 cannot process a PDF document because the MFP 102 does not have any font data included in the PDF document, and a "hardware error" which occurs when the MFP 102 detects an error originating from the hardware of the printer device.

FIGS. 14A to 14C each show an example of the assignment of identifiers in the MFP 102. The error IDs shown in FIG. 14A are state identifiers, uniquely assigned to the respective error states of the MFP 102. The operation IDs shown in FIG. 14B are operation identifiers uniquely assigned to the respective operation types for error recovery in the MFP 102. Referring to FIG. 14B, the operation type corresponding to the operation ID "OP001" is "print after buffer size adjustment" which is the processing of changing the limit value of the buffer size of the MFP 102. FIG. 14C shows an example of a table indicating error recovery operations (combinations of operation IDs) corresponding to device IDs and error IDs.

[Processing by MFP]

Figure 15:
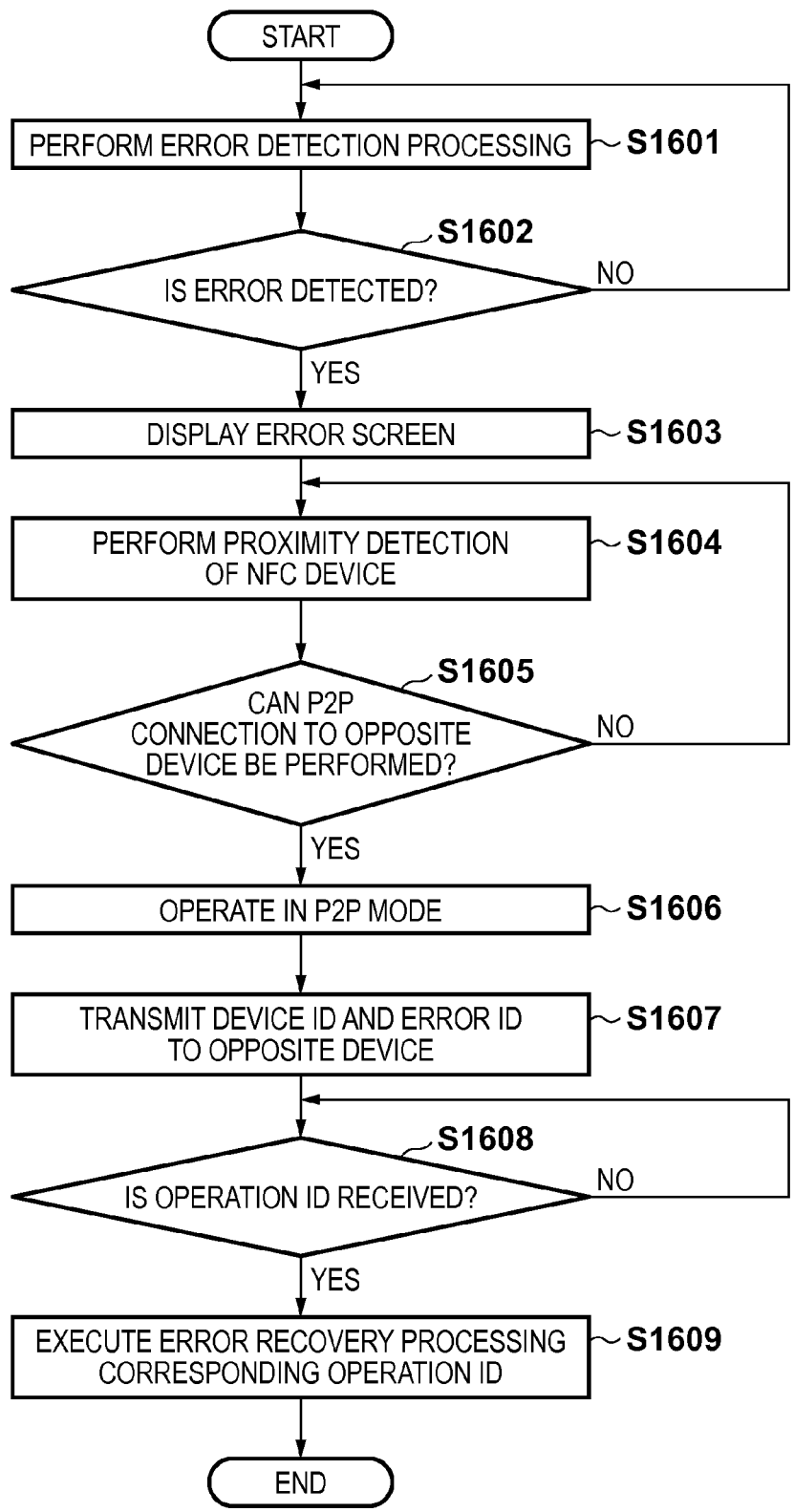
FIG. 15 is a flowchart for explaining processing by the CPU of an MFP in the third embodiment.

Processing by the CPU 301 of the MFP 102 in the third embodiment will be described with reference to the flowchart of FIG. 15. FIG. 15 will exemplify the processing to be performed in a state in which a buffer error as a rendering error has occurred in the MFP 102 with device ID=1.

A CPU 301 performs error detection processing for detecting an error which has occurred in the MFP 102 (S1601), and determines whether the error has been detected (S1602). If no error is detected, the process returns to step S1601.

If an error is detected, the CPU 301 displays an error screen on a display unit 308 (S1603), and performs NFC device proximity detection (S1604). Upon detecting NFC device proximity, the CPU 301 determines whether it is possible to perform P2P connection to the opposite device (S1605). If it is not possible to perform P2P connection, the process returns to step S1604.

If it is possible to perform P2P connection to the opposite device, the CPU 301 causes the MFP 102 to operate in the P2P mode (S1606). The CPU 301 then obtains an error ID corresponding to the error which has occurred by referring to the error ID correspondence table (FIG. 14A) held in the memory 302, and transmits the error ID and the device ID to the opposite device (S1607). In this case, the CPU 301 transmits device ID=1 of the MFP 102 and error ID="ERR001" corresponding to a buffer error to the opposite device.

The CPU 301 then waits for the reception of an operation ID (S1608). Upon detecting the reception of an operation ID, the CPU 301 executes error recovery processing corresponding to the received operation ID (S1609). The operation ID is operation information representing the result of user's selection of an error recovery operation. Upon receiving, for example, operation ID="OP001", the CPU 301 changes the limit value of the buffer size of the MFP 102 and performs a printing operation.

[Processing by Smartphone]

Processing by a CPU 201 of the smartphone 101 will be described with reference to the flowchart of FIG. 16.

The CPU 201 establishes NFC connection to the MFP 102 by causing the smartphone 101 to operate in the Listen mode and causing a communication unit 206 to repeatedly receive a command transmitted by the MFP 102 and return a response in each activity shown in FIG. 2 (S1701). The establishment timing of NFC connection is the timing in step S1606 shown in FIG. 15.

The CPU 201 then receives a device ID and an error ID from the MFP 102 (S1702). The reception timing comes after step S1607 shown in FIG. 15. The CPU 201 generates a data string of an operation ID of an error recovery operation corresponding to the received device ID and error ID by referring to the error ID correspondence table (FIG. 14C) held in the memory 202 (S1703). This data string will be referred to as an "operation ID list." hereinafter. In this case, since device ID=1 and error ID="ERR001", the operation ID list obtained from the correspondence table in FIG. 14C is "OP001, OP002".

The CPU 201 then displays, on the display unit 208, the operation ID list by using a character string defined in advance for each operation ID, and receives a touch operation by the user (S1704). When the user touches a selection button 2403 (to be described later) upon selecting an error recovery operation, the CPU 201 transmits an operation ID corresponding to the selected error recovery operation to the MFP 102 (S1705).

[Display Screen and Guide Information]

At Time of Buffer Error

Figure 17A:
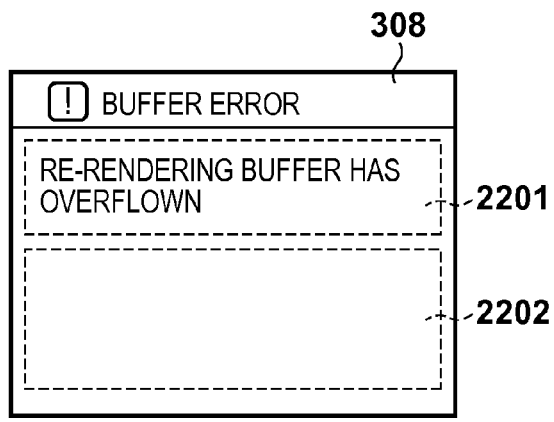
FIGS. 17A to 17C are views showing display examples at the time of a buffer error.
Figure 17B:
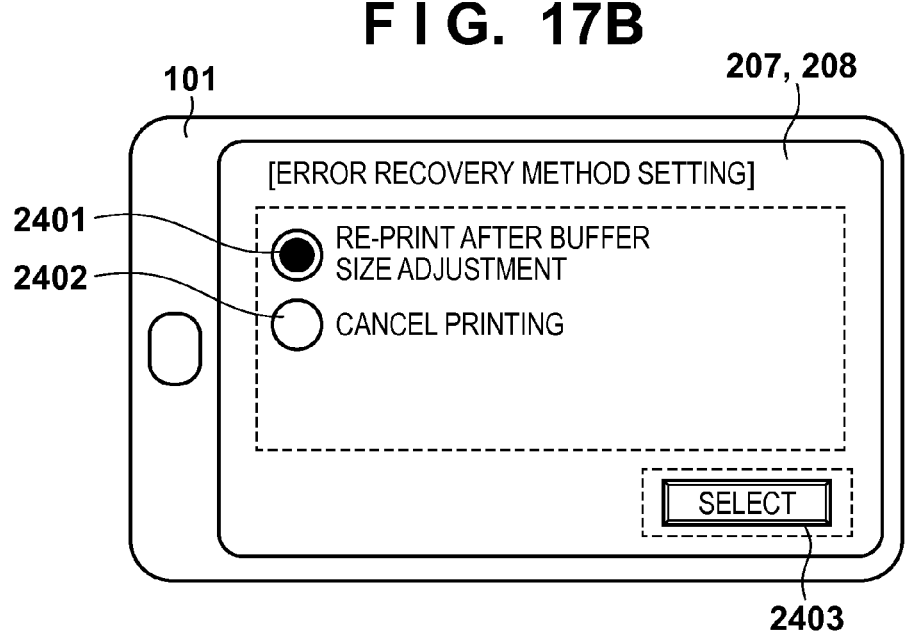
Figure 17C:
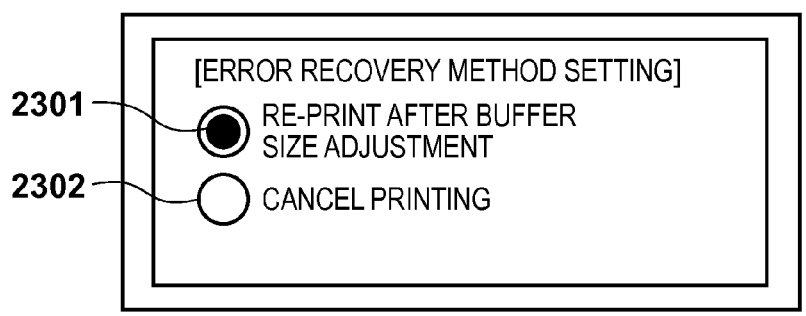

A display example at the time of a buffer error will be described with reference to FIGS. 17A to 17C, FIG. 17A shows a display example on the display unit 308 of the MFP 102. FIG. 17B shows a display example on the display unit. 208 of the smartphone 101.

As shown in FIG. 17A, the display unit 308 displays a message 2201 indicating "buffer error". FIG. 17B shows a display example on the smartphone 101 in step S1704. In this example, since "OP001, OP002" is obtained as an operation ID list in step S1703, the display unit. 308 displays a character string corresponding to these operation IDs and radio buttons 2401 and 2402. Upon selecting an error recovery operation with the radio buttons 2401 and 2402, the user touches the selection button 2403.

In addition, the CPU 301 may display the error recovery operation screen shown in FIG. 17C in the area 2202 of the screen shown in FIG. 17A in step S1603. Radio buttons 2301 and 2302 shown in FIG. 17C have the same functions as those of the radio buttons 2401 and 2402 shown in FIG. 17B. That is, the user can perform an operation to select, the radio button 2301 or 2302 by using a control panel 307.

When the user performs an operation to select the radio button 2401 or 2301, the CPU 301 performs printing upon changing the limit value of the buffer size of the MFP 102. When the user performs an operation to select the radio button 2402 or 2302, the CPU 301 cancels printing.

At Time of PDF Memory Error or PDF Font Error

FIGS. 18A to 18C each show an example of the assignment of identifiers in the MFP 102. The error IDs shown in FIG. ISA are state identifiers uniquely assigned to the respective error states of the MFP 102. The conversion IDs shown in FIG. 18B are conversion identifiers uniquely assigned to the respective conversion types for print data. FIG. 18C shows an example of a table indicating error recovery operations corresponding to device IDs and error IDs.

A recovery operation for a PDF memory error as a rendering error shown in FIG. 18A is, for example, "PDF lightening" (conversion ID="CONV001") of lightening PDF data. PDF lightening is the processing of reducing a processing load by deleting unnecessary objects in PDF data. In addition, a recovery operation for PDF font, error as a rendering error is, for example, "font embedding" (conversion ID="CONV002") of embedding font data in PDF data. Font embedding is the processing of generating PDF data in which font data is embedded to allow processing by the MFP 102.

Figure 19A:
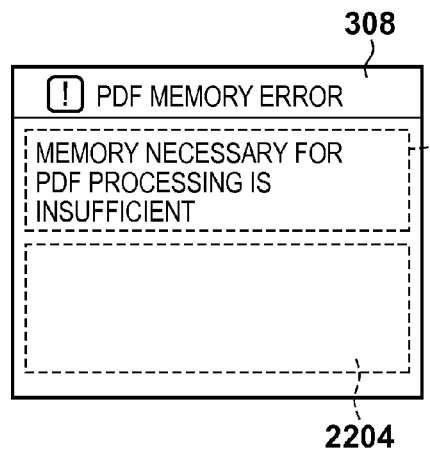
FIGS. 19A to 19D are views showing display examples at the time of a PDF memory error or PDF font error.
Figure 19B:
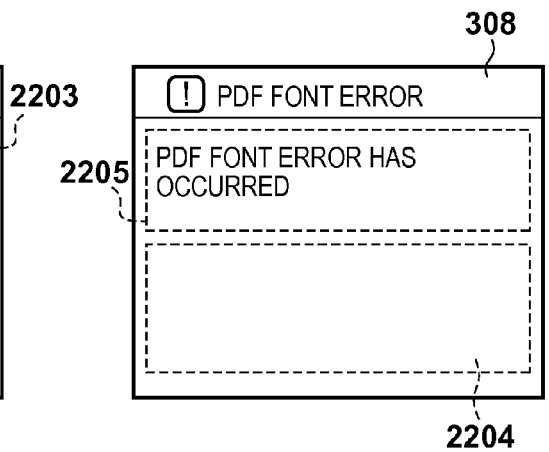
Figure 19C:
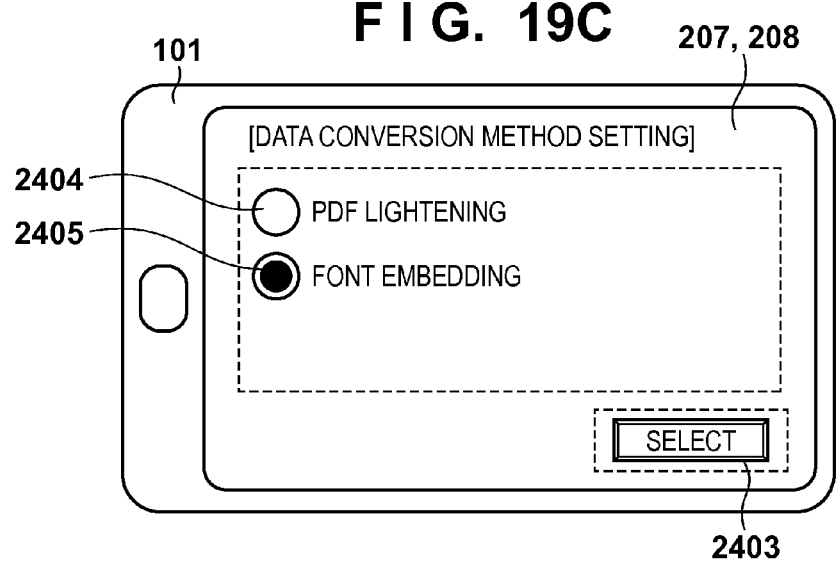

FIGS. 19A to 19D each show a display example at the time of a PDF memory error or PDF font error. FIGS. 19A and 19B each show a display example on the display unit 308 of the MFP 102. FIG. 19C shows a display example on the display unit 208 of the smartphone 101.

The CPU 301 displays an error message 2203 shown in FIG. 19A upon, detection of a PDF memory error, and displays an error message 2205 shown in FIG. 19B upon detecting a PDF font error (S1603). The CPU 301 obtains an error ID corresponding to an error which has occurred by referring to an error ID correspondence table (FIG. 18A) held in a memory 302, and transmits the error ID and a device ID to the opposite device (S1607).

If the received error ID is "ERR002" or "ERR003" (PDF memory error or PDF font, error), the CPU 201 generates a corresponding operation ID list by referring to the error ID correspondence table (FIG. 18C) (S1703). The CPU 201 then displays the operation ID list on the display unit 208 (S1704). In this example, since "CONV001" or "CONV001, CONV002" is obtained as an operation ID list in step S1703, the CPU 201 displays a character string corresponding to these operation IDs and radio buttons 2404 and 2405 (FIG. 19C). Upon selecting an error recovery operation with the radio buttons 2404 and 2405, the user touches the selection button 2403.

Figure 19D:
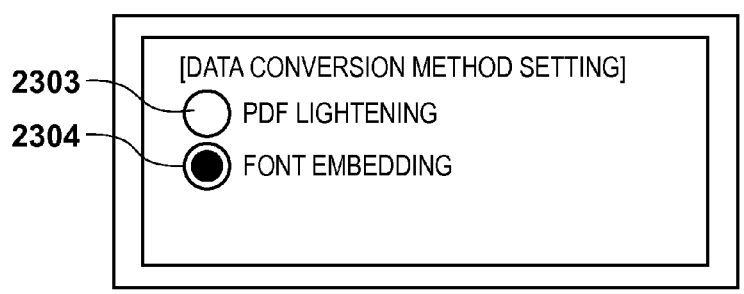

In addition, in step S1603, the CPU 301 may display the error recovery operation screen shown in FIG. 19D in an area 2204 of the screen shown in FIG. 19A or 19B. Radio buttons 2303 and 2304 shown in FIG. 19I) have the same functions as those of the radio buttons 2404 and 2405 shown in FIG. 19C. That is, the user can also perform an operation to select the radio button 2303 or 2304 by using the control panel 307.

When the user performs an operation to select the radio button 2404 or 2303, the CPU 301 performs PDF lightening processing for PDF data and prints the resultant data. When the user performs an operation to select the radio button 2405 or 2304, the CPU 301 performs font embedding processing for PDF data and prints the resultant data.

The MFP 102 executes PDF lightening processing and font embedding processing, if the MFP 102 has corresponding functions. If, however, the MFP 102 does not have such functions or the data processing ability of the MFP 102 is insufficient, a server apparatus connected to the MFP 102 via a network may execute the processing. Alternatively, if the smartphone 101 has a sufficient processing ability, the smartphone 101 may execute PDF lightening processing or font embedding processing upon receiving PDF data from the MFP 102, and return the PDF data as the processing result to the MFP 102.

At Time of Hardware Error

FIGS. 20A to 20C each show an example of the assignment, of identifiers in the MFP 102. The error IDs shown in FIG. 20A are state identifiers uniquely assigned to the respective error states of the MFP 102. The part IDs shown in FIG. 20B are part identifiers uniquely assigned to the respective parts of the MFP 102. FIG. 20C shows an example of a table indicating part IDs corresponding to device IDs and error IDs.

Figure 21A:
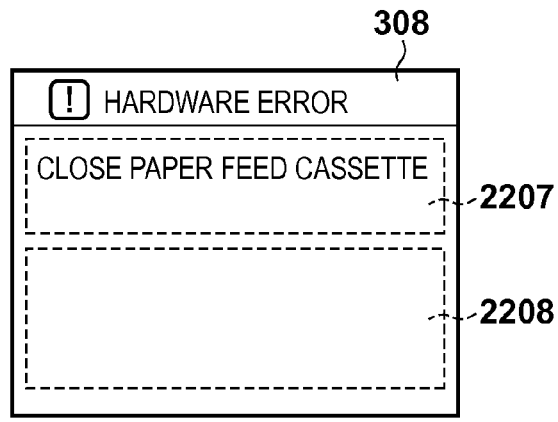
FIGS. 21A to 21C are views showing display examples at the time of a hardware error.
Figure 21B:
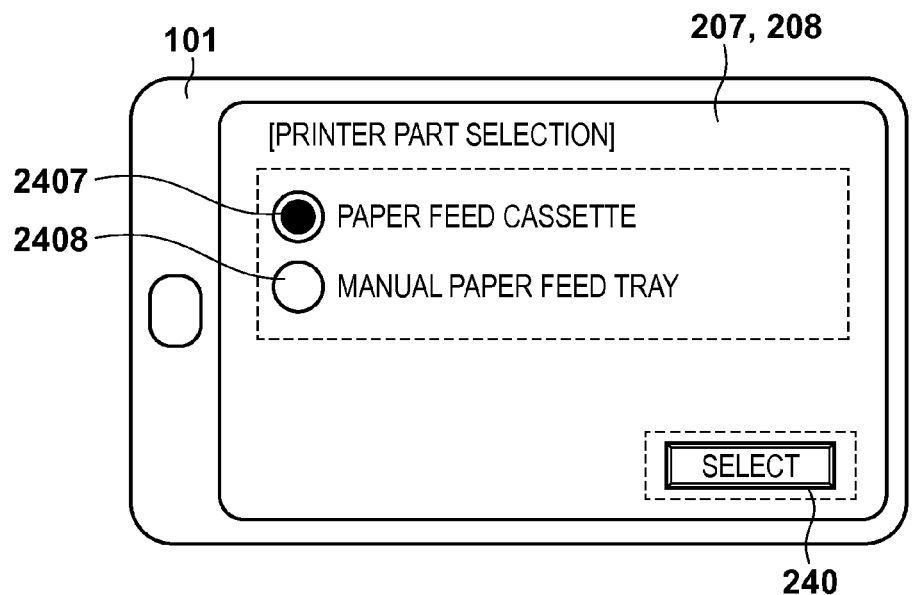
Figure 21C:
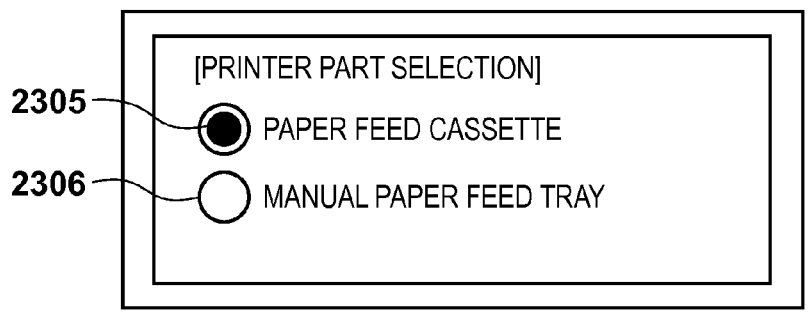

FIGS. 21A to 21C each show a display example at the time of a hardware error. FIG. 21A shows a display example on the display unit 308 of the MFP 102. FIG. 21B shows a display example on the display unit 208 of the smartphone 101.

The CPU 301 displays the error message 2203 shown in FIG. 21A on the display unit 308 upon detecting a hardware error (S1603). In this example, a paper feed cassette of the MFP 102 is in a state in which recording paper can be replenished. In this state, the MFP 102 cannot perform printing operation without closing the paper feed cassette, that is, accommodating the paper feed cassette in the apparatus. The CPU 301 then obtains an error ID corresponding to an error which has occurred by referring to the error ID correspondence table (FIG. 20A) held in the memory 302, and transmits the error ID and a device ID to the opposite device (S1607).

If the received error ID is "ERR004" (hardware error), the CPU 201 generates a corresponding operation ID list by referring to the error ID correspondence table (FIG. 20C) (S1703). The CPU 201 then displays the operation ID list on the display unit 208 (S1704). In this example, since the CPU 201 obtains "PARTS001 PARTS002" as an operation ID list in step S1703, the CPU 201 displays character strings corresponding to these part IDs and radio buttons 2407 and 2408 (FIG. 21C). Upon selecting one of the radio buttons 2407 and 2408 which corresponds to a part of occurrence of a hardware error whose specific position is desired to be known, the user touches the selection button 2403. In accordance with this selection, for example, an LED placed at the corresponding part of the MFP 102 emits light.

In addition, in step S1603, the CPU 301 may display the screen shown in FIG. 21C in an area 2208 of the screen shown in FIG. 21A. Radio buttons 2305 and 2306 shown in FIG. 21C have the same functions as those of the radio buttons 2407 and 2408 shown in FIG. 21B. That is, the user can also perform an operation to select the radio button 2305 or 2306 by using the control panel 307.

Prospective parts of occurrence of hardware errors in the MFP 102 are, for example, the paper feed cassette and the manual paper feed tray. LEDs are arranged at the respective parts at positions which allow the user to observe from outside the apparatus. The LED (Light-Emitting Diode) at the part selected by the user emits light to present the position of the specific part to the user. If, for example, the user selects the radio button 2407 in FIG. 21B, the LED placed on the paper feed cassette of the MFP 102 emits light. If the user selects the radio button 2408, the LED placed on the manual paper feed tray of the MFP 102 emits light.

Using the smartphone 101 in this manner enables the user to issue an instruction to perform an error recovery operation and an instruction to present a part associated with a hardware error by using the display unit 308 and control panel 307 of the MFP 102. In other words, the user can issue an instruction to perform an error recovery operation and an instruction to present a part by using either of the smartphone 101 and the MFP 102 which is easy to use for the user. In addition, the user can refer to an error recovery method list corresponding to an error state of the MFP 102 or a part associated with a hardware error by using the smartphone 101. Furthermore, the user can issue an instruction to perform an error recovery operation and an instruction to present the part by operating the smartphone 101.

Other Embodiment

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to foe accorded the broadest interpretation so as to encompass all such modifications and equivalent structures and functions.

This application claims the benefit of Japanese Patent Application No. 2013-083321 filed Apr. 11, 2013 which is hereby incorporated by reference herein in its entirety.

What is claimed is:

1. An information processing apparatus comprising:
a communication unit configured to perform a short-range wireless communication with a terminal apparatus;
an obtaining unit configured to obtain a state identifier indicating a state of the information processing apparatus;
a display control unit configured to control a display on a display unit; and
a transmission unit configured to transmit application information for specifying a display application to be activated, a device identifier of the information processing apparatus, and a first state identifier obtained by the obtaining unit to the terminal apparatus through the communication unit in a case where a distance between the information processing apparatus having the display control unit displaying a first screen and the terminal apparatus is changed from outside a communication range of the communication unit to within the communication range, and transmit the application information, the device identifier, and a second state identifier obtained by the obtaining unit to the terminal apparatus through the communication unit in a case where a distance between the information processing apparatus having the display control unit displaying a second screen and the terminal apparatus is changed from outside a communication range of the communication unit to within the communication range, thereby causing the terminal apparatus to display first additional information corresponding to the device identifier and the first state identifier using the display application specified by the application information or second additional information corresponding to the device identifier and the second state identifier using the display application.

2. The information processing apparatus according to claim 1, further comprising:
a control panel; and
a control unit configured to display an operation screen of the information processing apparatus on the control panel,
wherein the state identifier indicates an operation screen displayed on the control panel.

3. The information processing apparatus according to claim 2, wherein the additional information comprises at least one of a content explaining an operation method for an information processing apparatus, or a content explaining a setting method for an information processing apparatus.

4. The information processing apparatus according to claim 1, wherein the state identifier indicates an operation state of the information processing apparatus.

5. The information processing apparatus according to claim 4, wherein the additional information comprises at least one of a content explaining an operation state of an information processing apparatus, or a content explaining an error resolution method for an information processing apparatus.

6. The information processing apparatus according to claim 1, wherein the state identifier indicates a rendering error in the information processing apparatus.

7. The information processing apparatus according to claim 6, wherein the additional information comprises a content for selecting a recovery method for a rendering error in an information processing apparatus.

8. The information processing apparatus according to claim 7, further comprising a reception unit configured to receive operation information indicating a selection result of the recovery method from the terminal apparatus through the communication unit; and
a control unit configured to execute recovery processing for the rendering error in accordance with a recovery method indicated by the received operation information.

9. The information processing apparatus according to claim 1, wherein the state identifier indicates a hardware error in the information processing apparatus.

10. The information processing apparatus according to claim 9, wherein the additional information comprises a content for selecting a part of occurrence of a hardware error in an information processing apparatus.

11. The information processing apparatus according to claim 9, further comprising a reception unit configured to receive operation information indicating a selection result of the part of occurrence from the terminal apparatus through the communication unit; and
a control unit configured to present a part indicated by the received operation information.

12. The information processing apparatus according to claim 1, wherein the device identifier is an identifier for identifying a model type of the information processing apparatus.

13. The information processing apparatus according to claim 1, wherein the transmission unit is configured to transmit information for installing the display application to the terminal apparatus.

14. The information processing apparatus according to claim 1, wherein the transmission unit is configured to transmit information for downloading the display application to the terminal apparatus.

15. The information processing apparatus according to claim 1, wherein the communication unit is configured to perform Near Field Communication as the short-range wireless communication.

16. The information processing apparatus according to claim 1, wherein the first additional information and the second additional information are copy operation method expository content, density setting method expository content, recording paper setting method expository content, or duplex printing setting method expository content respectively wherein the first additional information and the second additional information are different from each other.

17. A terminal apparatus comprising:
a control panel;
a communication unit configured to perform a short-range wireless communication with an information processing apparatus;

a holding unit configured to hold additional information corresponding to a state of an information processing apparatus;

a reception unit configured to receive application information for specifying a display application to be activated, a device identifier of an information processing apparatus, and a state identifier indicating a state of the information processing apparatus through the communication unit in a case where a distance between the information processing apparatus and the terminal apparatus is changed from outside a communication range of the communication unit to within the communication range; and a control unit configured to automatically start the display application specified by the application information in response to the reception of the application information, to select additional information corresponding to the device identifier and the state identifier, and to display the selected additional information on a display screen of the control panel using the automatically started display application, wherein the selected additional information displayed on the display screen corresponds to the device identifier and the state indicated by the state identifier, and wherein, in a case where the reception unit receives the application information, the device identifier, and a first state identifier, the control unit displays on the display screen first additional information corresponding to the device identifier and the first state identifier, and in a case where the reception unit receives the application information, the device identifier, and a second state identifier, the control unit displays on the display screen second additional information corresponding to the device identifier and the second state identifier.

18. The terminal apparatus according to claim 17, wherein the device identifier is an identifier for identifying a model type of the information processing apparatus.

19. The terminal apparatus according to claim 17, wherein, in a case where the display application specified by the application information received by the reception unit is not installed in the terminal apparatus, the terminal apparatus is configured to download and install the display application according to information for downloading the display application.

20. The terminal apparatus according to claim 17, further comprising a display unit, wherein, in a case where the display application specified by the application information received by the reception unit is not installed in the terminal apparatus, the display unit is configured to display a message prompting an installation of the display application.

21. The terminal apparatus according to claim 17, wherein the communication unit is configured to perform Near Field Communication as the short-range wireless communication.

22. The terminal apparatus according to claim 17, wherein the first additional information and the second additional information are copy operation method expository content, density setting method expository content, recording paper setting method expository content, or duplex printing setting method expository content respectively wherein the first additional information and the second additional information are different from each other.

23. A control method of an information processing apparatus having a communication unit which performs a short-range wireless communication with a terminal apparatus and a display unit, the method comprising:

using a processor to perform:

obtaining a state identifier indicating a state of the information processing apparatus; and transmitting application information for specifying a display application to be activated, a device identifier of the information processing apparatus, and a first state identifier obtained in the obtaining to the terminal apparatus through the communication unit in a case where a distance between the information processing apparatus displaying a first screen on the display unit and the terminal apparatus is changed from outside a communication range of the communication unit to within the communication range, and transmitting the application information, the device identifier, and a second state identifier obtained in the obtaining to the terminal apparatus through the communication unit in a case where a distance between the information processing apparatus displaying a second screen on the display unit and the terminal apparatus is changed from outside a communication range of the communication unit to within the communication range, thereby causing the terminal apparatus to display first additional information corresponding to the device identifier and the first state identifier using the display application specified by the application information or second additional information corresponding to the device identifier and the second state identifier using the display application.

24. A non-transitory computer readable medium storing a computer-executable program for causing a computer to perform a control method of an information processing apparatus having a communication unit which performs a short-range wireless communication with a terminal apparatus and a display unit, the method comprising:

obtaining a state identifier indicating a state of the information processing apparatus; and transmitting application information for specifying a display application to be activated, a device identifier of the information processing apparatus, and a first state identifier obtained in the obtaining to the terminal apparatus through the communication unit in a case where a distance between the information processing apparatus displaying a first screen on the display unit and the terminal apparatus is changed from outside a communication range of the communication unit to within the communication range, and transmitting the application information, the device identifier, and a second state identifier obtained in the obtaining to the terminal apparatus through the communication unit in a case where a distance between the information processing apparatus displaying a second screen on the display unit and the terminal apparatus is changed from outside a communication range of the communication unit to within the communication range, thereby causing the terminal apparatus to display first additional information corresponding to the device identifier and the first state identifier using the display application specified by the application information or second additional information corresponding to the device identifier and the second state identifier using the display application.

25. A control method of a terminal apparatus having a control panel, and a communication unit which performs a short-range wireless communication with an information processing apparatus, the method comprising:

using a processor to perform:
holding additional information corresponding to a state of an information processing apparatus;
receiving application information for specifying a display application to be activated, a device identifier of an information processing apparatus, and a state identifier indicating a state of the information processing apparatus through the communication unit in a case where a distance between the information processing apparatus and the terminal apparatus is changed from outside a communication range of the communication unit to within the communication range;
automatically starting the display application specified by the application information in response to the reception of the application information;
selecting additional information corresponding to the device identifier and the state identifier; and
displaying the selected additional information on a display screen of the control panel using the automatically started display application,
wherein the selected additional information displayed on the display screen corresponds to the device identifier and the state indicated by the state identifier,
and wherein, in a case where the application information, the device identifier, and a first state identifier are received, first additional information corresponding to the device identifier and the first state identifier is displayed on the display screen, and in a case where the application information, the device identifier, and a second state identifier are received, second additional information corresponding to the device identifier and the second state identifier is displayed on the display screen.

26. A non-transitory computer readable medium storing a computer-executable program for causing a computer to perform a control method of a terminal apparatus having a control panel, and a communication unit which performs a short-range wireless communication with an information processing apparatus, the method comprising:
holding additional information corresponding to a state of an information processing apparatus;
receiving application information for specifying a display application to be activated, a device identifier of an information processing apparatus, and a state identifier indicating a state of the information processing apparatus through the communication unit in a case where a distance between the information processing apparatus and the terminal apparatus is changed from outside a communication range of the communication unit to within the communication range;
automatically starting the display application specified by the application information in response to the reception of the application information;
selecting additional information corresponding to the device identifier and the state identifier; and
displaying the selected additional information on a display screen of the control panel using the automatically started display application,
wherein the selected additional information displayed on the display screen corresponds to the device identifier and the state indicated by the state identifier,
and wherein, in a case where the application information, the device identifier, and a first state identifier are received, first additional information corresponding to the device identifier and the first state identifier is displayed on the display screen, and in a case where the application information, the device identifier, and a second state identifier are received, second additional information corresponding to the device identifier and the second state identifier is displayed on the display screen.

27. An information processing apparatus comprising:
a communication unit configured to perform a short-range wireless communication with a terminal apparatus;
an obtaining unit configured to obtain a state identifier indicating a state of the information processing apparatus;
a transmission unit configured to transmit application information for specifying a display application to be activated, a device identifier of the information processing apparatus, and the state identifier to the terminal apparatus through the communication unit in a case where a distance between the information processing apparatus and the terminal apparatus is changed from outside a communication range of the communication unit to within the communication range, thereby causing the terminal apparatus to display additional information corresponding to the device identifier and the state identifier using the display application specified by the application information; and
a reception unit configured to receive a startup notification of the display application from the terminal apparatus,
wherein, in a case where the startup notification of the display application is not received, the transmission unit transmits a message for prompting to install the display application to the terminal apparatus, and
wherein, in a case where receiving the startup notification, the transmission unit transmits information to determine matching of the display application to the terminal apparatus,
in a case where receiving a message indicating that the display application is mismatched from the terminal apparatus, the transmission unit transmits a message for prompting to install a suitable display application to the terminal apparatus, and
in a case where receiving a message indicating that the display application is matched from the terminal apparatus, the transmission unit performs the transmission of the device identifier and the state identifier.

28. A terminal apparatus comprising:
a control panel;
a communication unit configured to perform a short-range wireless communication with an information processing apparatus;
a holding unit configured to hold additional information corresponding to a state of an information processing apparatus;
a reception unit configured to receive application information for specifying a display application to be activated, a device identifier of an information processing apparatus, and a state identifier indicating a state of the information processing apparatus through the communication unit in a case where a distance between the information processing apparatus and the terminal apparatus is changed from outside a communication range of the communication unit to within the communication range;
a control unit configured to automatically start the display application specified by the application information in response to the reception of the application information, to select additional information corresponding to the device identifier and the state identifier, and to display the selected additional information on a display screen of the control panel using the automatically started display application; and a transmission unit configured to transmit a startup notification of the display application to the information processing apparatus, wherein the selected additional information displayed on the display screen corresponds to the device identifier and the state indicated by the state identifier, wherein, in a case where the startup notification of the display application is not transmitted to the information processing apparatus, the reception unit receives a message for prompting to install a display application from the information processing apparatus, and wherein, in a case where transmitting the startup notification, the reception unit receives information to determine matching of the display application from the information processing apparatus, and in a case where transmitting a message indicating that the display application is mismatched to the information processing apparatus, the reception unit receives a message for prompting to install a suitable display application from the information processing apparatus, and in a case where transmitting a message indicating that the display application is matched to the information processing apparatus, the reception unit receives the device identifier and the state identifier from the information processing apparatus.

* * * * *